US 8,186,772 B2

(12) United States Patent
Suzuki et al.

(10) Patent No.: US 8,186,772 B2
(45) Date of Patent: May 29, 2012

(54) VEHICLE BRAKE APPARATUS

(75) Inventors: Jiro Suzuki, Nagano (JP); Koji Sakai, Nagano (JP); Kazuhiro Tagata, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 1097 days.

(21) Appl. No.: 12/057,788

(22) Filed: Mar. 28, 2008

(65) Prior Publication Data
US 2008/0236971 A1 Oct. 2, 2008

(30) Foreign Application Priority Data

Mar. 30, 2007 (JP) ............................. P.2007-095594
Mar. 30, 2007 (JP) ............................. P.2007-095596
Mar. 30, 2007 (JP) ............................. P.2007-095597

(51) Int. Cl.
*B60T 8/44* (2006.01)
(52) U.S. Cl. ..................... 303/114.1; 303/11; 188/358
(58) Field of Classification Search ............ 303/11, 303/114.1, DIG. 11; 188/358; 60/592, 413, 60/417
See application file for complete search history.

(56) References Cited

U.S. PATENT DOCUMENTS

| | | | | |
|---|---|---|---|---|
| 3,942,844 A | * | 3/1976 | Inada et al. | 303/122.13 |
| 4,416,491 A | * | 11/1983 | Belart et al. | 303/114.1 |
| 4,753,069 A | * | 6/1988 | Seibert et al. | 60/591 |
| 5,044,700 A | * | 9/1991 | Willmann | 303/113.4 |
| 5,249,853 A | * | 10/1993 | Reinartz et al. | 303/114.1 |
| 6,065,815 A | * | 5/2000 | Terazawa et al. | 303/116.2 |
| 6,226,993 B1 | * | 5/2001 | Heibel | 60/547.3 |
| 6,386,647 B2 | * | 5/2002 | Oishi et al. | 303/114.1 |
| 6,478,385 B1 | * | 11/2002 | Nishii et al. | 303/114.1 |
| 6,557,950 B2 | * | 5/2003 | Ishida et al. | 303/20 |
| 6,663,191 B2 | * | 12/2003 | Sakata et al. | 303/3 |
| 6,945,610 B1 | | 9/2005 | Mizutani et al. | |
| 7,077,482 B2 | * | 7/2006 | Matsuno et al. | 303/114.1 |
| 2001/0025750 A1 | | 10/2001 | Oishi et al. | |

FOREIGN PATENT DOCUMENTS

DE 197 03 776 8/1998
DE 10 2004 025 638 9/2005
(Continued)

OTHER PUBLICATIONS

Office Action for Japanese Application No. JP2007-095594 dated Oct. 14, 2010 (English language translation attached), Dispatch date Oct. 20, 2010.
Office Action for Japanese Application No. JP2007-095597 dated Oct. 14, 2010 (English language translation attached), Dispatch date Oct. 20, 2010.

(Continued)

*Primary Examiner* — Robert A Siconolfi
*Assistant Examiner* — Mariano Sy
(74) *Attorney, Agent, or Firm* — Andrew M. Calderon; Roberts Mlotkowski Safran & Cole, P.C.

(57) ABSTRACT

A pressure regulating valve unit is configured to regulate the output hydraulic pressure of a hydraulic pressure generating source through electrical control for application to a boosted hydraulic pressure chamber, and a release valve is interposed between the boosted hydraulic pressure chamber and a reservoir which is adapted to the hydraulic pressure in the boosted hydraulic pressure chamber to the reservoir side when the pressure regulating valve unit fails.

16 Claims, 10 Drawing Sheets

FOREIGN PATENT DOCUMENTS

| | | |
|---|---|---|
| EP | 0 950 593 | 10/1999 |
| JP | 10095329 | 4/1998 |
| JP | 2000318597 | 11/2000 |
| JP | 2001071890 | 3/2001 |
| JP | 2002053026 | 2/2002 |
| JP | 2002264795 | 9/2002 |
| JP | 2002264797 | 9/2002 |
| JP | 2003160045 | 6/2003 |
| JP | 2005170244 | 6/2005 |
| JP | 2006240542 | 9/2006 |

OTHER PUBLICATIONS

Japanese Office Action for corresponding Application No. 2007-095596, dated Aug. 11, 2010.

European Search Report for corresponding Application No. 08006331.6-2423, dated Oct. 8, 2010.

* cited by examiner

VEHICLE BRAKE APPARATUS

BACKGROUND OF THE INVENTION

1. Field of the Invention

The present invention relates to a vehicle brake apparatus including a master cylinder having a master piston of which back side faces a boosted hydraulic pressure chamber and a casing accommodating the master piston in a slidable manner, a hydraulic pressure generating source, a reservoir, and a pressure regulating valve unit adapted to regulate an output hydraulic pressure of the hydraulic pressure generating source in response to an input of brake application effort from a brake operation member for application to the boosted hydraulic pressure chamber, the master cylinder being connected to wheel brakes.

2. Description of Related Art

A vehicle brake apparatus like one described above is known in, for example, Japanese Patent Unexamined Publication No. JP-A-2002-264795 and the like.

In the conventional brake apparatus described above, however, the pressure regulating valve unit is configured to mechanically operate in response to an input of brake application effort, and since this configuration not only makes the construction of the pressure regulating valve unit complex but also permits only a pressure regulation at a predetermined pressure in response to the input of brake application effort, when attempting to apply this very brake system to other model lines each having a different specification, a newly specified pressure regulating valve unit has to be prepared in consideration of boost ratio, stroke and the like which are specific to a model line to which the brake system is attempted to be applied, this increasing the number of kinds of components parts involved.

Further in the vehicle brake apparatus disclosed in JP-A-2002-264795 above, a hydraulic pressure generating source is such as to include a pump and a high pressure accumulator which is connected to the pump, and since it has to stand for high pressure, the high pressure accumulator has a housing whose thickness is thick and hence the weight thereof is increased much, whereby the hydraulic pressure generating source becomes heavy, and the layout performance thereof is deteriorated. Then, although it has been considered that the hydraulic pressure generating source is configured by only the pump by deleting the high pressure accumulator, when depending upon an approach in which only an increase in pump head is sought for, the pressure raising response at the initial stage of the brake applying operation is reduced.

SUMMARY OF THE INVENTION

The invention has been made in view of these situations.

One object of the invention is to provide a vehicle brake apparatus including a pressure regulating valve unit which is adapted to be applied to model lines each having a different specification without involving any adaptation so as to avoid the increase in the number of kinds of components involved and of which the configuration is simplified.

Another object thereof is to provide a vehicle brake apparatus which enables avoidance of a reduction in pressure raising response while enhancing the layout performance thereof on the vehicle body without using the high pressure accumulator which utilizes the housing whose thickness is thick.

With a view to attaining the object, according to a first aspect of the invention, there is provided a vehicle brake apparatus including:

a boosted hydraulic pressure chamber;
a master cylinder including:
 a master piston of which back side faces the boosted hydraulic pressure chamber; and
 a casing accommodating the master piston in a slidable manner;
a hydraulic pressure generating source;
a reservoir; and
a pressure regulating valve unit which regulates output hydraulic pressure of the hydraulic pressure generating source in response to an input of brake application effort from a brake operation member for application to the boosted hydraulic pressure chamber;
 wherein the master cylinder is connected to wheel brakes,
 the pressure regulating valve unit electrically controls to adjust the output hydraulic pressure of the hydraulic pressure generating source to apply the adjusted hydraulic pressure to the boosted hydraulic pressure chamber,
 a release valve is interposed between the boosted hydraulic chamber and the reservoir, and
 the release valve releases the hydraulic pressure in the boosted hydraulic pressure chamber to the reservoir side when the pressure regulating valve unit fails.

In addition, according to a second aspect of the invention, there is provided a vehicle brake apparatus as set forth in the first aspect of the invention, wherein
 the pressure regulating valve unit includes:
 a one-way valve provided between the hydraulic pressure generating source and the boosted hydraulic pressure chamber so as to permit only a flow of brake fluid from the hydraulic pressure generating source side; and
 a linear solenoid valve interposed between the boosted hydraulic pressure chamber and the reservoir.

According to a third aspect of the invention, there is provided a vehicle brake apparatus as set forth in the first aspect of the invention, wherein
 the pressure regulating valve unit includes:
 a primary linear solenoid valve interposed between the hydraulic pressure generating source and the boosted hydraulic pressure chamber and
 a secondary linear solenoid valve interposed between the boosted hydraulic pressure chamber and the reservoir.

Furthermore, according to a fourth aspect of the invention, wherein
 the release valve is a normally closed solenoid valve.

With a view to attaining the object, according to a fifth aspect of the invention, there is provided a vehicle brake apparatus including:
a boosted hydraulic pressure chamber;
a master cylinder including:
 a master piston of which back side faces the boosted hydraulic pressure chamber; and
 a casing accommodating the master piston in a slidable manner;
a hydraulic pressure generating source;
a reservoir; and
a pressure regulating valve unit which regulates output hydraulic pressure of the hydraulic pressure generating source in response to an input of brake application effort from a brake operation member for application to the boosted hydraulic pressure chamber;
 wherein the master cylinder is connected to wheel brakes,
 the hydraulic pressure generating source is made up of only the pump,
 an accumulator is connected to the pump via a valve which prevents flow of the brake fluid to the pump side at least when the pump is not in operation, an inlet valve is interposed between the boosted hydraulic pressure chamber and the accumulator, and the inlet valve opens as the hydraulic pressure on the accumulator side increases higher beyond a set differential pressure than the hydraulic pressure on the boosted hydraulic pressure chamber side and also opens by mechanical pressure applied from the brake operation member at an initial stage of a brake applying operation.

In addition, according to a sixth aspect of the invention, there is provided a vehicle brake apparatus as set forth in the fifth aspect of the invention, wherein the pump is connected to the accumulator via an orifice.

According to a seventh aspect of the invention, there is provided a vehicle brake apparatus as set forth in the fifth aspect of the invention, wherein an open-close-valve is provided between the pump and the accumulator, and the open-close-valve opens when the brakes are applied except the initial stage of the brake applying operation.

According to a eighth aspect of the invention, there is provided a vehicle brake apparatus as set forth in the first aspect of the invention, wherein the pressure regulating valve unit includes:
a one-way valve which is provided between the pump and the boosted hydraulic pressure chamber so as to permit only a flow of brake fluid from the pump side; and
a linear solenoid valve which is interposed between the boosted hydraulic pressure chamber and the reservoir, and
a release valve, which opens in response to an arbitrary operation by the driver, is provided in parallel with the linear solenoid valve between the boosted hydraulic pressure chamber and the reservoir.

Furthermore, according to a ninth aspect of the invention, there is provided a vehicle brake apparatus as set forth in the ninth aspect of the invention, wherein the linear solenoid valve is a normally closed solenoid valve, and the release valve is a normally closed solenoid valve.

With a view to attaining the object, according to a tenth aspect of the invention, there is provided a vehicle brake apparatus including:

a boosted hydraulic pressure chamber;
a master cylinder including:
a master piston of which back side faces the boosted hydraulic pressure chamber; and
a casing accommodating the master piston in a slidable manner;
a hydraulic pressure generating source;
a reservoir, and
a pressure regulating valve unit which regulates output hydraulic pressure of the hydraulic pressure generating source in response to an input of brake application effort from a brake operation member for application to the boosted hydraulic pressure chamber;
wherein the master cylinder is connected to wheel brakes,
the hydraulic pressure generating source is made up of only the pump,
an accumulator is connected to the pump via an open-close-valve which is controlled by a control unit, and
the control unit controls the open-close-valve to open or close so as to accumulate a hydraulic pressure by a preset set pressure in the accumulator at least while the brakes are not applied and while the brakes are being applied with the pump in an operating state and controls the open-close-valve to open at an initial stage of a brake applying operation.

According to an eleventh aspect of the invention, there is provided a vehicle brake apparatus as set forth in the tenth aspect of the invention, wherein the pressure regulating valve unit includes:
a primary linear solenoid valve provided between the pump and the boosted hydraulic pressure chamber, and
a secondary linear solenoid valve provided between the boosted hydraulic pressure chamber and the reservoir.

According to a twelfth aspect of the invention, there is provided a vehicle brake apparatus as set forth in the tenth aspect of the invention, wherein the pressure regulating valve unit includes:
a one-way valve provided between the pump and the boosted hydraulic pressure chamber so as to permit only a flow of brake fluid from the pump side; and
a linear solenoid valve provided between the boosted hydraulic pressure chamber and the reservoir.

According to a thirteenth aspect of the invention, there is provided a vehicle brake apparatus as set forth in the eleventh aspect of the invention, wherein a release valve, which opens in response to an arbitrary operation by the driver, is provided between the boosted hydraulic pressure chamber and the reservoir.

According to a fourteenth aspect of the invention, there is provided a vehicle brake apparatus as set forth in the thirteenth aspect of the invention, wherein the release valve is a normally closed solenoid valve.

According to the first aspect of the invention, since the pressure regulating valve unit is such as to be electrically be driven and controlled, the boost ratio can freely be changed according to a model line to which the brake system is applied and also the brake system is allowed to be applied to many model lines each having a different specification with the simple configuration, thereby making it possible to avoid an increase in the number of kinds of components involved. Moreover, when the regulating valve unit fails for some reason, by releasing the release valve, the hydraulic pressure in the boosted hydraulic pressure chamber can be released.

In addition, according to the second and third aspects of the invention, the configuration of the pressure regulating valve unit can be simplified.

Furthermore, according to the fourth aspect of the invention, since the release valve only has to be deenergized to maintain its closed state when the brakes are applied normally, the consumption of electric power can be suppressed.

According to the fifth aspect of the invention, since the hydraulic pressure generating source is made up of only the pump and the necessity is obviated of utilizing the high pressure accumulator using the housing whose thickness is thick, the layout performance of the hydraulic pressure generating source on the vehicle body can be enhanced.

Moreover, the inlet valve is closed in such a state that the hydraulic pressure equal to or less than the set differential pressure is accumulated in the accumulator due to the hydraulic pressure in the boosted hydraulic pressure chamber being reduced while the brakes are not applied after the end of the brake applying operation, while at the initial stage of the brake applying operation, the inlet valve is opened by the mechanical pressure applied thereto from the brake operation member, whereby the hydraulic pressure equal to or less than the set differential pressure is applied to the boosted hydraulic pressure chamber in response to the opening of the inlet valve. Then, by setting the capacity of the accumulator and the differential pressure which is the pressure held by the accumulator sufficiently low to such an extent that the initial operation of the master cylinder is permitted, the reduction in pressure raising response can be avoided while the capacity and weight of the accumulator are made sufficiently small to such an extent that the layout performance of the hydraulic pressure generating source on the vehicle body is enhanced.

In addition, according to the sixth aspect of the invention, it can be configured that no pulsation is generated in the hydraulic pressure applied to the accumulator from the pump.

According to the seventh aspect of the invention, the discharge pressure of the pump is introduced into the accumulator when the brakes are applied except the initial state of the brake applying operation, so that the hydraulic pressure can be allowed to be accumulated in the accumulator by the inlet valve closing, once it has opened, in response to a reduction in hydraulic pressure in the boosted hydraulic pressure chamber after the end of the brake applying operation.

According to the eighth aspect of the invention, the pressure regulating valve unit can be made up simply by the one-way valve and the linear solenoid valves and the occurrence of a hydraulically locked state in the boosted hydraulic pressure chamber when the pressure regulating valve unit fails can be avoided with the simple configuration.

Furthermore, according to the ninth aspect of the invention, when the brakes are normally applied, the normally closed linear solenoid valve may only have to be energized to open so as to reduce the hydraulic pressure in the boosted hydraulic pressure chamber, and the release valve may only have to be deenergized so as to be held in the valve closed state, thereby making it possible to suppress the consumption of electric power.

According to the tenth aspect of the invention, since the hydraulic pressure generating source is made up of only the pump and the high pressure accumulator is deleted, the layout performance of the hydraulic pressure generating source can be enhanced.

Moreover, the hydraulic pressure accumulated by the preset set pressure is accumulated in the accumulator at least while the brakes are not applied and while the brakes are being applied is applied to the boosted hydraulic pressure chamber at the initial stage of the brake applying operation. Then, by setting the capacity of the accumulator and the pressure held in the accumulator to low levels which are sufficient to permit the initial operation of the master cylinder, the reduction in pressure raising response can be avoided while reducing the capacity and weight of the accumulator to such an extent that the layout performance of the hydraulic pressure generating source on the vehicle body is enhanced.

In addition, according to the eleventh aspect of the invention, the pressure regulating valve unit can be configured so simply as to be made up of the two linear solenoid valves, and the boost ratio can freely be changed depending upon models lines to which the brake system is applied, whereby the brake system with the hydraulic pressure generating source can be applied to various type of models lines each having a different specification with the simple configuration.

According to the twelfth aspect of the invention, the pressure regulating valve unit can be configured so simply as to be made up of the one-way valve and the linear solenoid valve. Additionally the boost ratio can freely be changed depending upon models lines to which the brake system is applied, whereby the brake system with the hydraulic pressure generating source can be applied to various type of models lines each having a different specification with the simple configuration.

According to the thirteenth aspect of the invention, the occurrence of a hydraulically locked state in the boosted hydraulic pressure chamber when the pressure regulating valve unit fails can be avoided with the simple configuration.

According to the fourteenth aspect of the invention, since the release valve only has to be deenergized to maintain its closed state when the brakes are applied normally, the consumption of electric power can be suppressed.

DETAILED DESCRIPTION OF THE PREFERRED EMBODIMENTS

Hereinafter, a mode for carrying out the invention will be described based on embodiments of the invention which are illustrated in the accompanying drawings.

<First Embodiment>

Figure 1:
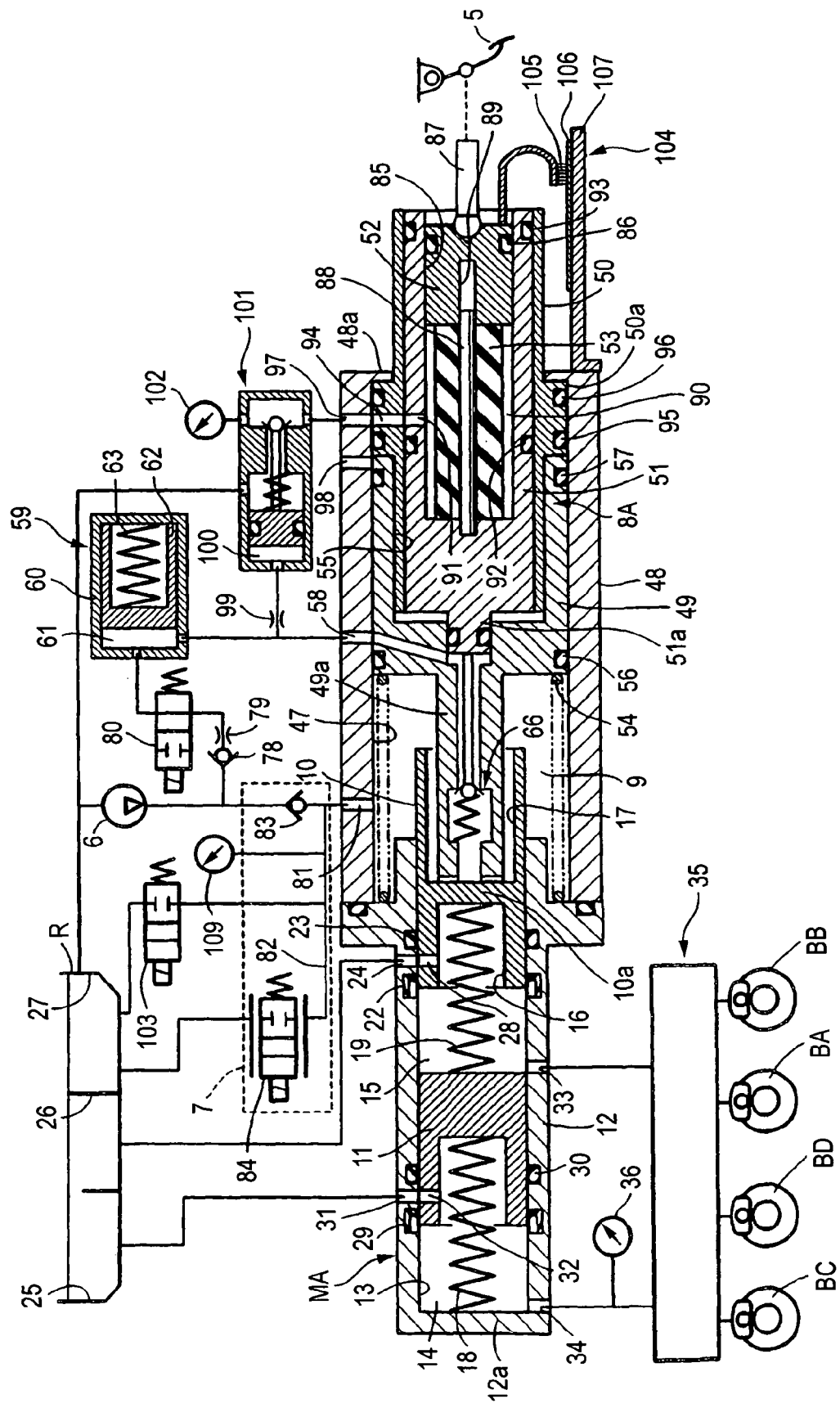
FIG. 1 is a brake hydraulic pressure system diagram showing an overall configuration of a vehicle brake apparatus of a first embodiment.
Figure 2:
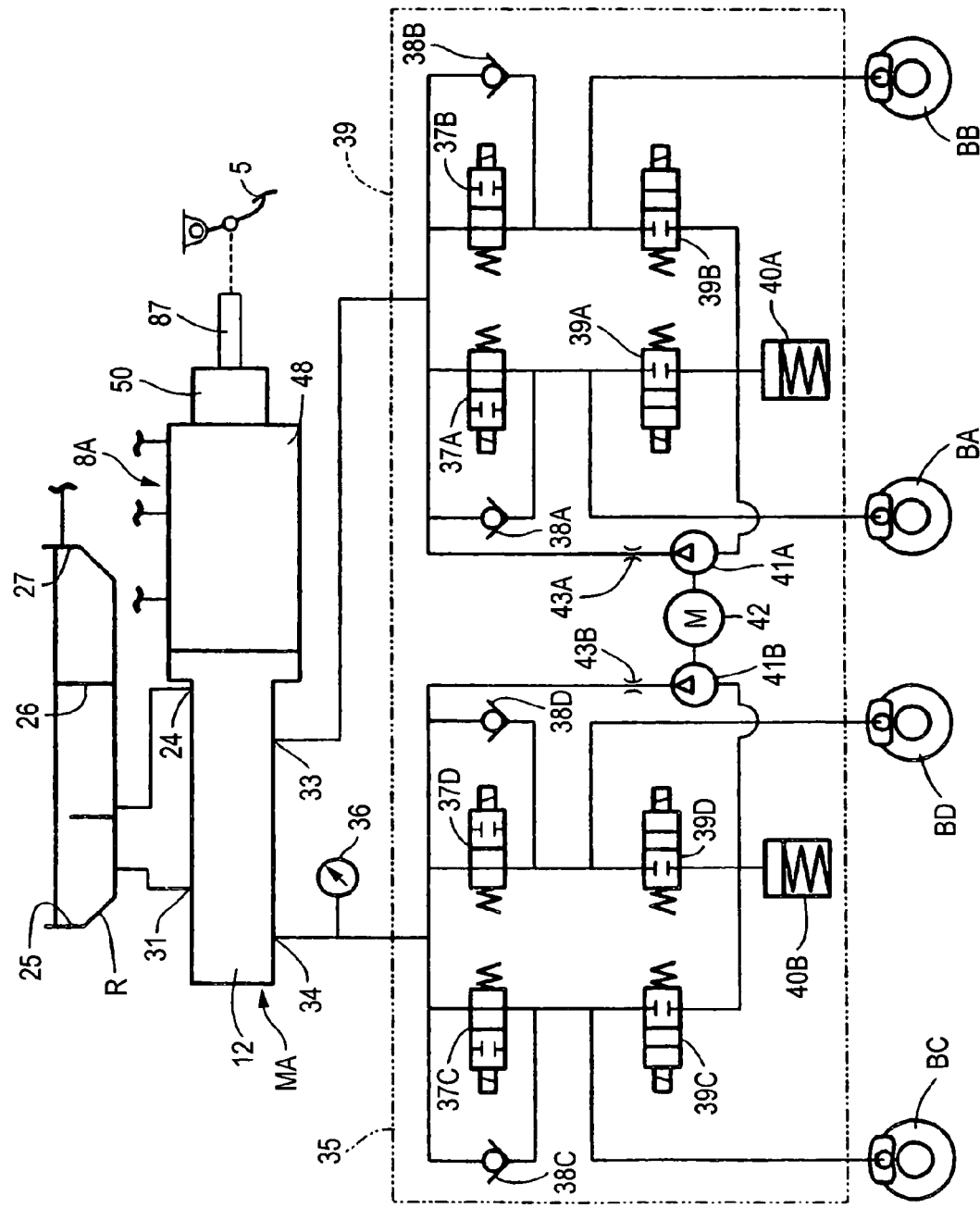
FIG. 2 is a hydraulic pressure circuit diagram showing the configuration of a hydraulic pressure modulator.
Figure 3:
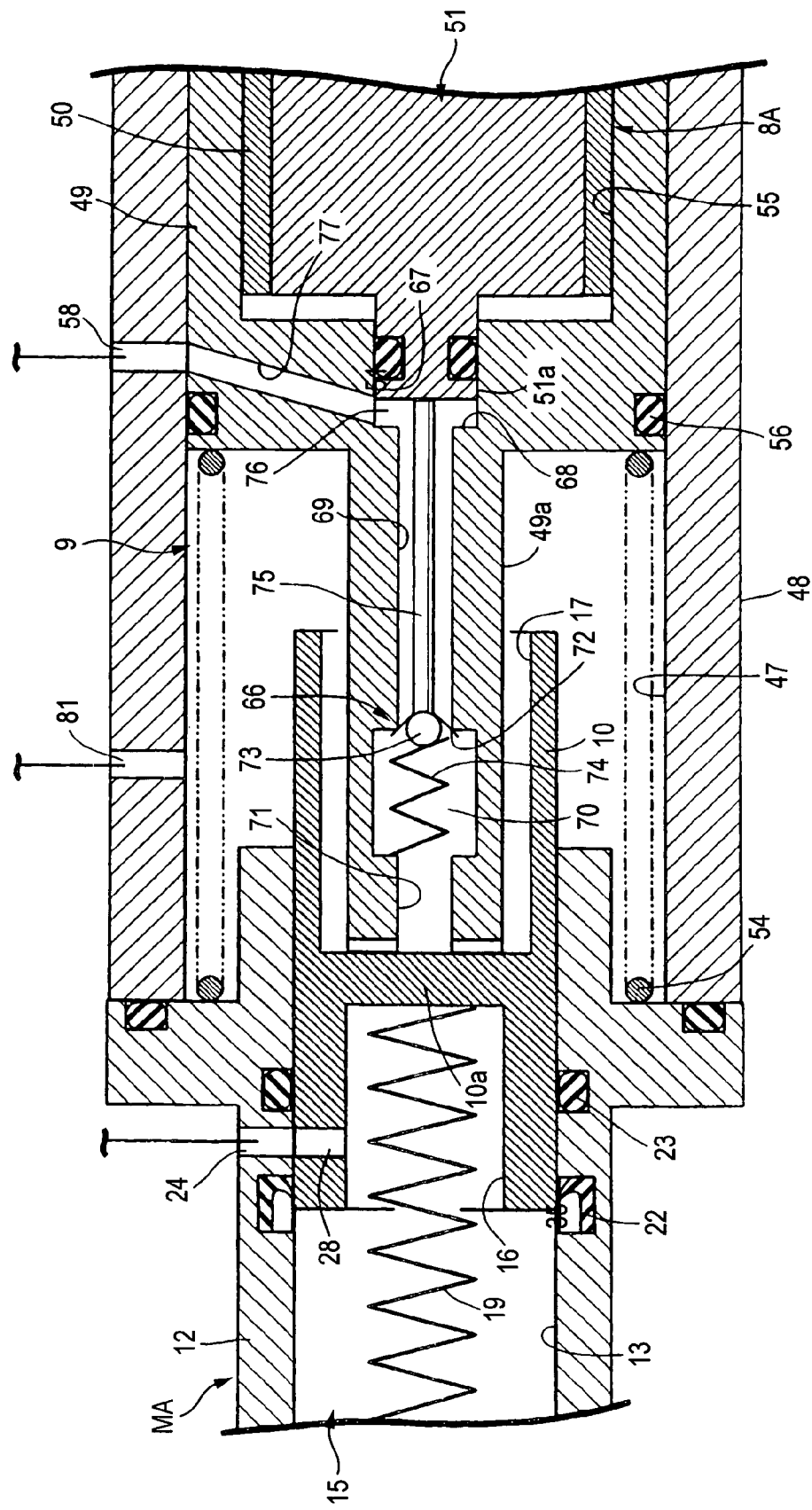
FIG. 3 is an enlarged view of a main part of FIG. 1.

FIGS. 1 to 3 are such as to illustrate a first embodiment of the invention, of which FIG. 1 is a brake hydraulic pressure system diagram showing an overall configuration of a vehicle brake apparatus, FIG. 2 is a hydraulic pressure circuit diagram illustrating the configuration of a hydraulic pressure modulator, and FIG. 3 is an enlarged view of a main part of FIG. 1.

Firstly, in FIG. 1, a brake system of a four-wheel vehicle includes:

a tandem type master cylinder MA, a pressure regulating valve unit 7 adapted to regulate the hydraulic pressure of a pump 6, which is a hydraulic pressure generating source, in response to an input of brake application effort from a brake pedal 5, which is a brake operation member, for application to the master cylinder MA, and a stroke simulator 8A adapted to simulate an operation stroke of the brake pedal 5.

The master cylinder MA includes:

a rear master piston 10 of which a back side is made to face a boosted hydraulic pressure chamber 9 and which is biased rearwards by a spring and a front master piston 11 which is disposed in front of the rear master piston 10 while being biased rearwards by a spring.

The rear master piston 10 and the front master piston 11 are slidably fitted in a primary casing 12.

A primary cylinder bore 13, which is closed at a front end by an end wall 12a, is provided in the primary casing 12. The front master piston 11 is formed into a bottomed cylindrical shape which is opened at a front end so as to define a front output hydraulic pressure chamber 14 with the front end wall 12a and is slidably fitted in the primary cylinder bore 13. In addition, the rear master piston 10 is slidably fitted in the primary cylinder bore 13 so as to define a rear output hydraulic pressure chamber 15 with the front master piston 11.

Moreover, in the rear master piston 10, a primary recess portion 16 which is opened at an end thereof which lies to face the rear output hydraulic pressure chamber 15 and a secondary recess portion 17 which is opened at an end thereof which lies to face the boosted hydraulic pressure chamber 9 are provided coaxially so as to align via a bulkhead 10a provided therebetween.

In the front output hydraulic pressure chamber 14, a front return spring 18, which is provided in a compressed state between the closed end of the front master piston 11 which is formed into the bottomed cylindrical shape and the end wall 13a, is accommodated so as to exhibit a spring force which biases the front master piston 11 rearwards.

On the other hand, in the rear output hydraulic pressure chamber 19, a rear return spring 23, which is provided in a compressed state between the bulkhead 10a of the rear master piston 10 and the front master piston 11, is accommodated so as to bias the rear master piston 10 rearwards.

A rear lip seal 22, which is brought into sliding contact with an outer circumference of the rear master piston 10, and an annular seal member 23, which is brought into sliding contact with the outer circumference of the rear master piston 10 in a position lying further rearwards than the rear lip seal 22, are mounted on an inner circumference of the primary cylinder bore 13. A release port 24 is provided in the primary casing 12 between the rear lip seal 22 and the annular seal member 23 so as to communicate with a portion defined between the primary casing 12 and the rear master piston 10. The rear release port 24 is connected to a secondary fluid reservoir chamber 26 of the reservoir R. The rear lip seal 22 permits a flow of brake fluid from the secondary fluid reservoir chamber 26 to the rear output hydraulic pressure chamber 15 side when the hydraulic pressure in the rear output hydraulic pressure chamber becomes lower than the hydraulic pressure in a space produced between the rear master piston 10 and the primary casing 12 between the rear lip seal 22 and the annular seal member 23, that is, the hydraulic pressure in the secondary fluid reservoir chamber 26. In addition, a relief hole 28 is provided in the rear master piston 10 so as to establish a communication between the rear release portion 24 and the rear output hydraulic pressure chamber 15 in a withdrawal limit position (a position shown in FIG. 1) of the rear master piston 10.

A front lip seal 29 is brought into sliding contact with an outer circumference of the front master piston 11. An annular seal member 30 is brought into sliding contact with the outer circumference of the front master piston 11 in a position lying further rearwards than the front lip seal 29. The front lip seal 29 and the annular seal member 30 are mounted on the inner circumference of the primary cylinder bore 13 so as to be spaced apart from each other in an axial direction. A front release portion 31 is provided in the primary casing 12 between the front lip seal 29 and the annular seal member 30 so as to communicate with a space produced between the inner circumference of the primary cylinder bore 13 and the outer circumference of the front master piston 11 between the rear lip seal 29 and the annular seal member 30. This front release port 31 is connected to a primary fluid reservoir chamber 25 of the reservoir R. Thus, the front lip seal 29 permits a flow of brake fluid from the primary fluid reservoir chamber 25 to the front output hydraulic pressure chamber 14 side when the hydraulic pressure in the front output hydraulic pressure chamber 14 becomes lower than the hydraulic pressure in a space produced between the front master piston 11 and the primary casing 12 between the front lip seal 29 and the annular seal member 30, that is, the hydraulic pressure of the primary fluid reservoir chamber 25. In addition, a relief hole 32 is provided in the front master piston 11 so as to establish a communication between the front release port 31 and the front output hydraulic pressure chamber 14 in a withdrawal limit position of the front master piston 11.

Provided in the primary casing 12 are:

a rear output port 33 which outputs the hydraulic pressure of the rear output pressure chamber 15 in which a high pressure is developed as the rear master piston 10 travels forwards; and a front output port 34 which outputs the hydraulic pressure of the front output hydraulic pressure chamber 14 in which a high pressure is developed as the front master piston 11 travels forwards.

Moreover, the rear output port 33 is connected to wheel brakes BA, BB for a right front wheel and a left rear wheel via a hydraulic pressure modulator 39, while the front output port 34 is connected to wheel brakes BC, BD for a left front wheel and a right rear wheel via the hydraulic pressure modulator 35. In addition, a hydraulic pressure sensor 36 is connected to the front output port 34.

In FIG. 2, the hydraulic pressure modulator 35 includes:

a normally open solenoid valve 37A which is interposed between the rear output port 33 and the wheel brake BA for the right front wheel;

a normally open solenoid valve 37B which is interposed between the rear output port 33 and the wheel brake BB for the left rear wheel;

one-way valves 38A, 38B which are connected in parallel, respectively, to both the normally open solenoid valves 37A, 37B so as to permit a flow of brake fluid to the rear output port 33 side;

a normally closed solenoid valve 39A which is interposed between the wheel brake BA for the right front wheel and a primary fluid reservoir 40;

a normally closed solenoid valve 39B which is interposed between the wheel brake BB for the left rear wheel and the first reservoir 40;

a normally open solenoid valve 37C which is interposed between the front output port 34 and the wheel brake BC for the left front wheel;

a normally open solenoid valve 37D which is interposed between the front output port 34 and the wheel brake BD for the right rear wheel;

one-way valves 38C, 38D which are connected in parallel, respectively, to both the normally open solenoid valves 37C, 37D so as to permit a flow of brake fluid to the front output port 34 side;

a normally closed solenoid valve 39C which is interposed between the wheel brake BC for the left front wheel and a second reservoir 40B;

a normally closed solenoid valve 39D which is interposed between the wheel brake BD for the right rear wheel and the second reservoir 40B;

a first pump 41A which pumps up the hydraulic pressure in the first reservoir 40A to return it to the rear output port 33 side;

a second pump 41B which pumps up the hydraulic pressure in the second reservoir 40B to return it to the front output port 34 side;

an electric motor 42 which commonly drives the first and second pumps 41A, 41B;

a first orifice 43A interposed between the first pump 41A and the rear output port 33; and a second orifice 43B interposed between the second pump 41B and the front output port 34.

According to the hydraulic pressure modulator 35 which is configured as has been described above, the brake hydraulic pressures outputted from the rear and front output ports 33, 34 can freely be regulated, and an anti-lock brake control in a brake applied state can be executed.

Referring again to FIG. 1, the stroke simulator 8A has:

a secondary casing 48 which has a secondary cylinder bore 47 which is coaxial with the primary cylinder bore 13 and is formed larger in diameter than the primary cylinder bore 13 and which is connected fluid tightly and coaxially with a rear part of the primary casing 12, a backup piston 49 which defines the boosted hydraulic pressure chamber 9 which a rear part of the rear master piston 10 is made to face in the master cylinder MA with a rear end of the primary casing 12 and which is slidably fitted in the secondary cylinder bore 47, a cylindrical sleeve 50 which has in an axial intermediate portion an outwardly directed flange portion 50a which is brought into abutment with an inwardly directed flange portion 48a provided at a rear end of the secondary casing 48 from the front thereof and of which a front half portion is slidably fitted in the backup piston 49, a simulator piston 51 which is slidably fitted in the sleeve 50, an input piston 52 which is relatively slidably fitted in the simulator piston 51, an elastic element 53 which is interposed between the input piston 52 and the simulator piston 51, and a spring 54 which is provided in a compressed state between the primary casing 12 and the backup piston 49.

The backup piston 49 has a primary sliding bore 55 which is made to open rearwards so that the front half portion of the sleeve 50 can be fitted therein and is slidably fitted in the secondary cylinder bore 47 so that its withdrawal limit position is restricted when the backup piston 49 is brought into abutment with the inwardly directed flange portion 48a, which is provided at the rear end of the secondary casing 48, via the outwardly directed flange portion 50a of the sleeve 50. An abutment projection 49a is provided coaxially at a front end of the backup piston 49 so as to project therefrom. This fitting projection 49a is inserted into the secondary recess portion 17 provided in the rear master piston 10 in the master cylinder MA so that a leading end thereof is brought into abutment with a closed end of the secondary recess portion 17 or the bulkhead 10a.

In addition, a pair of annular seal members 56, 57, which are adapted to be brought into sliding contact with an inner circumference of the secondary cylinder bore 47, are mounted on an outer circumference of the backup piston 49 so as to be spaced apart from each other in the axial direction. A communication hole 58, which is made to open towards an inner surface of the secondary cylinder bore 47 between both the annular seals 56, 57, is provided in the secondary casing 48. This communication hole 58 is made to communicate with an accumulator chamber 61 of an accumulator 59.

The accumulator 59 includes:

a cylindrical housing 60 which is closed at both ends, a bottomed cylindrical accumulator piston 62 which is slidably fitted in the housing 60 while defining the accumulator chamber 61 with one end of the housing 60, and an accumulator spring 63 which is provided in a compressed state between the other end of the housing and the accumulator piston 62 so as to exhibit a spring force which biases the accumulator piston 62 to a side which reduces the volume of the accumulator chamber 61. This accumulator 59 is configured to be relatively small in size.

Then, an inlet valve 66 is interposed between the boosted hydraulic pressure chamber 9 and the accumulator 59, and this inlet valve 66 is incorporated in a front part of the backup piston 49.

In FIG. 3, a secondary sliding bore 67 is provided in the backup piston 49 so as to have a smaller diameter than the primary sliding bore 55 and to coaxially continue to the primary sliding bore 55. A fitting projection 51a provided at a front end of the simulator piston 51 is allowed to be fitted fluid tightly and relatively slidably fitted to the secondary sliding bore 67.

In an area from a front part of the backup piston 49 to the abutment projection 49a, there is provided:

an annular stepped portion 68 which faces rearwards so that a front end of the fitting projection 51a can be brought into abutment therewith;

a valve bore 69 which is formed at a front side of the annular stepped portion 68;

a valve chamber 70 which communicates with a front end of the valve bore 69; and a communication bore 71 which extends coaxially with the valve bore 69 with the valve chamber 70 held between the valve bore 69 and itself.

A front end of the communication bore 71 is made to open at a front end of the abutment projection 49a so as to communicate with the boosted hydraulic pressure chamber 9 at all times.

The inlet valve 66 includes:

a valve body 73 which is accommodated in the valve chamber 70 so as to be seated on a valve seat 72 formed on a circumferential edge portion of a front end of the valve bore 69 to thereby close the valve bore 69;

a valve spring 74 provided in a compressed state between the abutment projection 49a and the valve body 73 so as to exhibit a spring force which biases the valve body 73 so as to be seated on the valve seat 72; and a valve opening rod 75 which is provided continuously to the valve body 73 and is passed coaxially through the valve bore 69.

A rear end of the valve opening rod 75 is brought into abutment with the front end of the fitting projection 51a of the simulation piston 51.

Thus, a fluid chamber 76 is formed within the backup piston 49 between the front end of the fitting projection 51a and the annular stepped portion 68, and a communication path 77 is provided in the backup piston 49 which establishes a communication between the fluid chamber 76 and the communication hole 58.

A pressure held in the accumulator 59 is applied to the fluid chamber 76 and a hydraulic pressure produced by the hydraulic pressure of the fluid chamber 76 is applied to the valve body 73 which is in a closed position in a valve opening direction. On the other hand, hydraulic pressure produced by the hydraulic pressure of the valve chamber 70 which communicates with the boosted hydraulic pressure chamber 9 via the communication bore 71 and a spring force of the valve spring 74 are applied to the valve body 73 which is in the closed position in a valve closing direction. The inlet valve 66 opens when the hydraulic pressure in the valve opening direction which is the hydraulic pressure resulting when the hydraulic pressure in the valve chamber 70 or the boosted hydraulic pressure chamber 9 is subtracted from the hydraulic pressure of the fluid chamber 76 or the accumulator 59 overcomes the spring force of the valve spring 74.

In addition, at an initial stage of a brake applying operation by the brake pedal 5, force is applied to the simulator piston 51 from the input piston 52 via the elastic element 53 in a direction which causes the simulator piston 51 to travel forwards relative to the backup piston 49, and the valve opening rod 75 is pushed by virtue of the advancement of the simulator piston 51 and the fitting projection 51a relative to the backup piston 49, whereby the inlet valve 66 is caused to open.

Namely, the inlet valve 66 opens as the hydraulic pressure on the accumulator 59 side becomes higher than the hydraulic pressure on the boosted hydraulic pressure chamber 9 side beyond a set differential pressure which corresponds to the spring load of the valve spring 74 and is also caused to open by pressure mechanically applied from the brake pedal 5 at the initial stage of the brake applying operation.

Referring again to FIG. 1, the pump 6 which is the hydraulic pressure generating source is such as to pump up brake fluid from a tertiary fluid reservoir chamber 27 of the reservoir R. A discharge portion of the pump 6 is connected to the accumulator chamber 61 of the accumulator 59 via: a primary one-way valve 78 which is a valve for interrupting a flow of brake fluid to the pump 6 side at least when the pump 6 is not in operation; a tertiary orifice 79; and a normally open solenoid valve 80 which is an open-close-valve which opens when the brakes are applied except the initial stage of the brake applying operation.

In addition, a supply port 81 is provided in the secondary casing 48 so as to communicate with the boosted hydraulic pressure chamber 9, and a hydraulic pressure path 82 is connected to this supply port 81. Thus, the pressure regulating valve unit 7 includes a secondary one-way valve 83 which is provided between the pump 6 and the hydraulic pressure path 82 so as to permit only a flow of brake fluid from the pump 6 and a linear solenoid valve 84 which is provided between the hydraulic pressure path 82 and the tertiary fluid reservoir chamber 27 of the reservoir R. A hydraulic pressure sensor 103 is connected to the hydraulic pressure path 82 which is adapted to detect the hydraulic pressure in the boosted hydraulic pressure chamber 9.

In addition, a release valve 103, which is adapted to open in response to an arbitrary operation by the driver of the vehicle, is provided in parallel to the linear solenoid valve 84 between the hydraulic pressure path 82 which communicates with the boosted hydraulic pressure chamber 9 and the tertiary fluid reservoir chamber 27 of the reservoir R. The release valve 103 is a normally closed solenoid valve.

A bottomed tertiary sliding bore 85, which is made to open rearwards, is provided coaxially in the simulator piston 51. The input piston 52, on an outer circumference of which an annular seal member 86 is provided so as to be brought into sliding contact with an inner circumference of the tertiary sliding bore 85, is slidably fitted in the tertiary sliding bore 85. An input rod 87, which is connected to the brake pedal 5, is directly connected to the input piston 52 at a front end portion thereof so as to pivot therein. Namely, brake application effort is inputted into the input piston 52 as the brake pedal 5 is operated via the input rod 87, whereby the input piston 52 is operated to travel forwards in response to an input of brake application effort by the brake pedal 5.

The elastic element 53 is such as to be formed into a cylindrical shape of an elastic material such as rubber so as to have an outside diameter which is smaller than an inside diameter of the tertiary sliding bore 85 in a natural state in which no external force is applied thereto. A front end of a guide shaft 88 which passes through the elastic element 53 is fitted in a front end wall of the tertiary sliding bore 85 in the simulator piston 51. In addition, a bottomed quaternary sliding bore 893 which is opened at a front end thereof is provided in the input piston 52. A rear portion of the guide shaft 88 is slidably fitted in the quaternary sliding bore 89.

Incidentally, an annular fluid chamber 90 is defined between an outer circumference of the elastic element 53 and the inner circumference of the tertiary sliding bore 85. A communication hole 91 communicating with the annular fluid chamber 90 is provided in the simulator piston 51. Moreover, a pair of seal members 92, 93 are mounted on the outer circumference of the simulator piston 51 so as to hold the communication hole 91 therebetween from both sides thereof in the axial direction and to be brought into sliding contact with an inner circumference of the sleeve 50. A communication hole 94 is provided in the sleeve 50 which opens to an inner surface of the sleeve 50 between the seal members 92, 93 at an inner end and opens to an outer circumference of the outwardly directed flange portion 50a at an outer end thereof irrespective of axial travel of the simulator piston 51.

In addition, annular seal members 95, 96, which hold therebetween the communication hole 94 from both sides, are mounted on the outer circumference of the outwardly directed flange portion 50a of the sleeve 50 so as to be brought into sliding contact with the inner circumference of the secondary cylinder bore 47. A release port 97 is provided in the secondary casing 48 so as to communicate with the communication hole 94. In addition, a release hole 98 is provided in the second case 48 so as to open to an inner surface of the secondary cylinder bore 47 between an annular seal member 57 mounted at a rear portion of the backup piston 49 and the forward annular seam member 95 of the pair of annular seal members 95, 96 mounted on the outer circumference of the outwardly directed flange portion 50a. This release hole 98 allows a space produced between the backup piston 49 and the sleeve 50 and the simulator piston 51 to communicate with an exterior portion of the secondary casing 48 at all times.

A pilot operated secondary open-close-valve 101 having a pilot chamber 101 connected to the accumulator chamber 61 of the accumulator 59 via a quaternary orifice 99 is interposed between the tertiary fluid reservoir chamber 27 of the reservoir R and the release port 87. Although this open-close-valve 101 opens to allow the release port 97 to communicate with the tertiary fluid reservoir chamber 27, when the hydraulic pressure in the pilot chamber 100 is sufficiently high, in the event that the pump 6, which is the hydraulic pressure generating source, fails to lower the hydraulic pressure in the pilot chamber 100, the open-close-valve 101 closes to interrupt the communication between the release port 97 and the tertiary fluid reservoir chamber 27, so as to hold the annular fluid chamber 90 in the stroke simulator 8A in a hydraulically locked state. In addition, a hydraulic pressure sensor 102 is attached to the open-close-valve 101 which is adapted to detect the hydraulic pressure in the annular fluid chamber 90.

Incidentally, the operation of the linear solenoid valve 84 in the pressure regulating valve unit 7 is controlled according to the amount of brake application effort made by the brake pedal 5. A detection unit 104 is adapted to detect the amount of brake application effort. This detection unit 104 includes, for example a brush 105 which is mounted on the input piston 52 and a pair of electrically conductive elements 106 . . . which extend in parallel with the axial direction of the input piston 52 so as to change a sliding contact position of the brush 105 as the input piston 52 travels in the axial direction. The electrically conductive elements 106 . . . are mounted on a support member 107 which is mounted at a rear end of the secondary casing 48.

Next the function of the first embodiment will be described. In a non-brake applied state, the normally open solenoid valve 80 is in an open state, and the accumulator 59 is holding a hydraulic pressure is held therein which is equal to or less than the set differential pressure necessary to open the inlet valve 66. When the brake pedal 5 is depressed to attempt to apply the brakes in this state, the operation of the pump 6 is started, and the input piston 52 travels forwards while compressing the elastic element 53, whereby the inlet valve 66 opens as a mechanical pressure produced in association with the brake pedal 5 being depressed is applied thereto from the simulator piston 51. As this occurs, a hydraulic pressure is applied to the boosted hydraulic pressure chamber 9, whereby the brake applying operation of the master cylinder MA is started.

Incidentally, although the volume of the annular fluid chamber 90 lying on the perimeter of the elastic element 53 is reduced as the input piston 52 travels forwards, since the open-close-valve 101 is kept open in association with the application of hydraulic pressure from the accumulator 59, there is no case where the pressure within the annular fluid chamber 90 is increased. Further, a reaction force applied to the brake pedal 5 in the initial stage of the depressing operation of the brake pedal 5 is nothing but a spring force from the from the elastic element 53.

Thus, the discharge pressure of the pump 6 is applied to the boosted hydraulic pressure chamber 9 as the pump 6 operates, and when an amount of brake application effort made by the brake pedal 5 is detected by the detection unit 104, the linear solenoid valve 84 of the pressure regulating valve unit 7 operates to adjust the hydraulic pressure in the boosted hydraulic pressure chamber 9 to match the amount of brake application effort so detected. As this occurs, the normally open solenoid valve 80 is closed, and the inlet valve 66 closes as the hydraulic pressure in the boosted hydraulic pressure chamber 9 increases.

In the tandem type master cylinder MA, as the hydraulic pressure in the boosted hydraulic pressure chamber 9 increases, the rear and front master pistons 10, 11 travel forwards against the spring forces of the rear and front return springs 19, 18, and hydraulic pressures produced in the rear and front output hydraulic pressure chambers 15, 14 are outputted from the rear and front output ports 33, 34, respectively. Namely, the boosted brake hydraulic pressure can be applied to the respective wheel brakes BA to BD by operating the rear and front master pistons 10, 11 of the master cylinder MA.

Moreover, the hydraulic pressure generating source is made up of the pump 6, and hence since the necessity can be obviated of using an accumulator using a housing having a large thickness, thus, the layout characteristic of the brake system on to the body of the vehicle can be enhanced.

In addition, (1) the accumulator 59 is connected to the pump 6 via the one-way valve 78 which prevents the flow of brake fluid to the pump 6 side when the pump 6 is not in operation and (2) the inlet valve 66 is interposed between the boosted hydraulic pressure changer 9 and the accumulator 59 which is adapted to open as the hydraulic pressure on the accumulator 59 side becomes higher than the hydraulic pressure on the boosted hydraulic pressure chamber 9 side beyond the set differential pressure and is also adapted to be opened by the pressure which is mechanically applied thereto from the brake pedal 5 at the initial stage of the brake applying operation. Due to these configurations, (1) the inlet valve 66 is closed in such a state that a hydraulic pressure which is equal to or less than the set differential pressure is accumulated in the accumulator 59 by a drop in hydraulic pressure in the boosted hydraulic pressure chamber 9 when the brakes have not yet been applied although the brakes have been activated. Also, in the initial stage of the brake applying operation, the inlet valve 66 is opened by the pressure which is mechanically applied to the inlet valve 66 from the brake operation member, whereby the hydraulic pressure from the accumulator 59 which is equal to or less than the set differential pressure is applied to the boosted hydraulic pressure chamber 9 in response to the opening of the inlet valve 66.

Then, by setting the capacity of the accumulator 59 and the differential pressure which is the pressure held in the accumulator 59 to small levels which are still sufficient for the initial operation of the master cylinder, the reduction in pressure raising response can be avoided while reducing the capacity and weight of the accumulator 59 to such an extent that the layout on to the body of the vehicle can be enhanced.

In addition, since the pump 6 is connected to the accumulator 59 via the tertiary orifice 79, the generation of pulsation in the hydraulic pressure applied to the accumulator 59 from the pump 6 can be prevented. Moreover, since the normally open solenoid valve 80, which is adapted to open while the brakes are applied except the initial stage of the brake applying operation, is interposed between the pump 6 and the accumulator 59, the hydraulic pressure can be accumulated in the accumulator 59 by inducing the discharge pressure of the pump 6 into the accumulator 59 while the brakes are applied except the initial stage of the brake applying operation and closure of the inlet valve 66 which has been kept open in response to the drop in hydraulic pressure in the boosted hydraulic pressure chamber 9 after the end of brake application.

Furthermore, since the pressure regulating valve unit 7 is made up of the secondary one-way valve 83 which is interposed between the pump 6 and the boosted hydraulic pressure chamber 9 so as to permit only the flow of brake fluid from the pump 6 side; and the linear solenoid valve 84 which is interposed between the boosted hydraulic pressure chamber 9 and the tertiary fluid reservoir chamber 27 of the reservoir R, and the pressure regulating valve unit 7 is configured to be driven electrically. Therefore, the boost ratio can be freely changed depending on model lines, and hence, the brake system can be applied to various types of vehicles each having a different specification with the simple configuration, whereby not only can an increase in the number of components involved be avoided but also the pressure regulating valve unit 7 can be configured simply by the secondary one-way valve 83 and the linear solenoid valve 84. As this occurs, since the hydraulic pressure applied from the pump 6 is accumulated in accumulator 59 via the primary one-way valve 78 and the orifice 79, brake fluid can be supplied to the boosted hydraulic pressure chamber 9 via the secondary one-way valve 83 for preference.

Moreover, since the release valve 103, adapted to open in response to an arbitrary operation by the driver of the vehicle, is provided in parallel with the linear solenoid valve 84 between the boosted hydraulic pressure chamber 9 and the reservoir R, the locking of hydraulic pressure in the boosted hydraulic pressure chamber 9 can be avoided with the simple configuration which would otherwise be caused when the pressure regulating valve unit 7 fails.

Furthermore, since the linear solenoid valve 84 is the normally closed solenoid valve while the release valve 103 is the normally closed solenoid valve; when the brakes are applied in a normal fashion, the normally closed linear solenoid valve 84 may only have to be energized to open so as to reduce the hydraulic pressure in the boosted hydraulic pressure chamber 9 while the release valve 103 may be held in the closed state, thereby making it possible to suppress the consumption of electric power.

Incidentally, when the pump 6 fails, the open-close-valve 101 is closed, and a hydraulic pressure locking state is produced in the annular fluid chamber 90 on the perimeter of the elastic element 53. Due to this, in the stroke simulator 8A, the backup piston 49 travels forwards against the spring force of the spring 54 together with the input piston 52 as the brake pedal 5 is depressed, and the leading end of the fitting projection 49a of the backup piston 49 is brought into abutment with the rear master piston 10 to thereby push the rear master piston 10 in the forward direction, whereby the master cylinder MA can be activated to operate as the brake pedal 5 is depressed even when the pump 6 fails.

<Second Embodiment>

Figure 4:
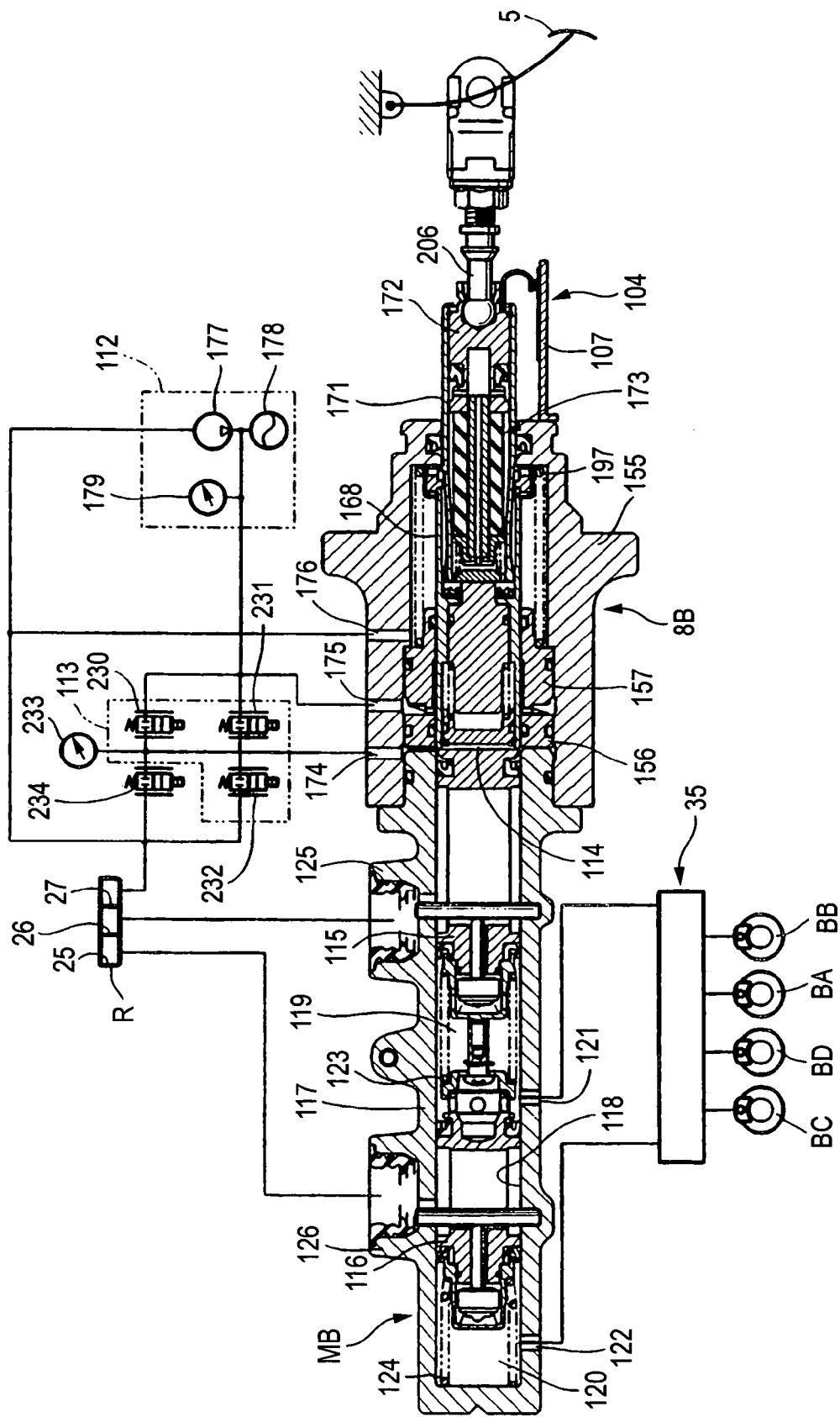
FIG. 4 is a brake hydraulic pressure system diagram showing an overall configuration of a vehicle brake apparatus of a second embodiment.
Figure 5:
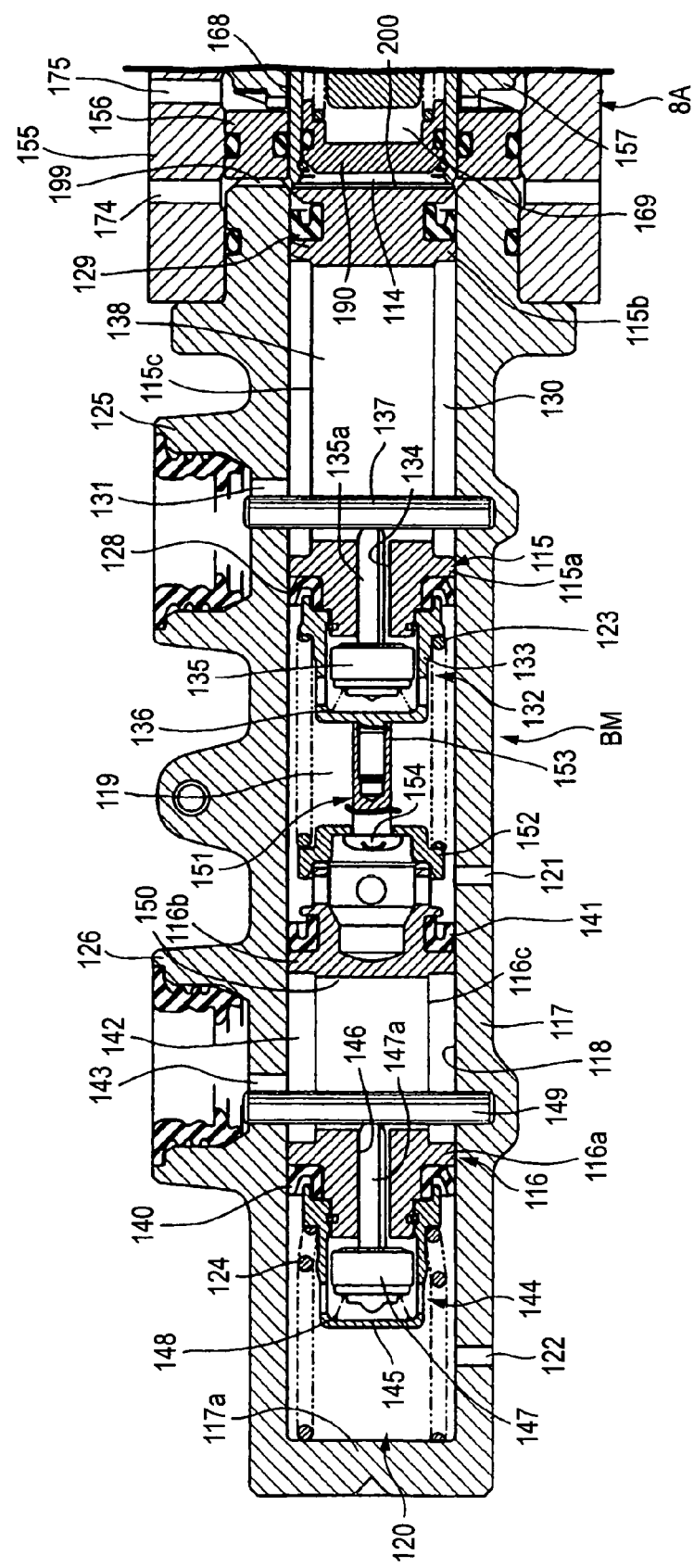
FIG. 5 is an enlarged longitudinal sectional view of a master cylinder.
Figure 6:
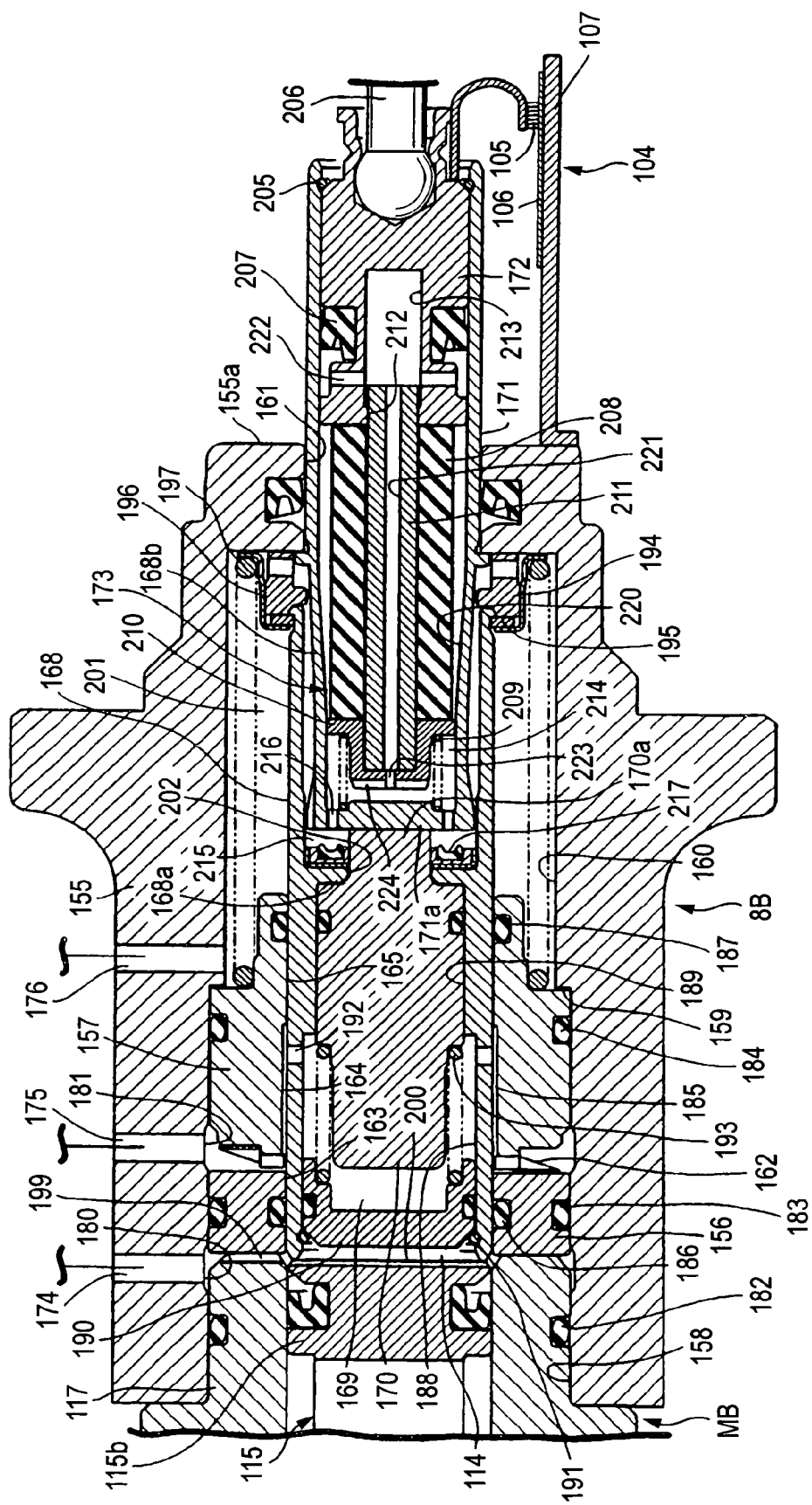
FIG. 6 is a longitudinal sectional view of a stroke simulator.

FIGS. 4 to 6 show a second embodiment of the invention, of which FIG. 4 is a brake hydraulic pressure system diagram which shows an overall configuration of a vehicle brake apparatus, FIG. 5 is an enlarged longitudinal sectional view of a master cylinder, and FIG. 6 is a longitudinal sectional view of a stroke simulator.

Firstly, in FIG. 4, a brake system of a four-wheel vehicle includes a tandem type master cylinder MB, a pressure regulating valve unit 113 adapted to regulate the hydraulic pressure of a hydraulic pressure generating source 112 in response to an input of brake application effort from a brake pedal 5 for application to the master cylinder MB, and a stroke simulator 8B adapted to simulate an operation stroke of the brake pedal 5.

The master cylinder MB includes: a rear master piston 115 of which a back side is made to face a boosted hydraulic pressure chamber 114 and which is biased rearwards by a spring and a front master piston 116 which is disposed in front of the rear master piston 115 while being biased rearwards by a spring. The rear master piston 115 and the front master piston 116 are slidably fitted in a tertiary casing 117 which is formed into a bottomed cylindrical shape which is closed at a front end thereof.

Referring also to FIG. 5, on the tertiary casing 117 having an end wall 117a at the front end, a tertiary cylinder bore 118, which is closed at a front end by the end wall 117a, is provided. Further, the rear master piston 115 is slidably fitted in the tertiary cylinder bore 118 with its back side made to face the boosted hydraulic pressure chamber 114. Furthermore, the front master piston 116 is slidably fitted in the tertiary cylinder bore 118 while defining a rear output hydraulic pressure chamber 119 between the rear master piston 115 and itself and defining a front output hydraulic pressure chamber 120 between the end wall 117a and itself.

Provided in the tertiary casing 117 are a rear output port 121 which communicates with the rear output hydraulic pressure chamber 119; and a front output port 122 which communicates with the front output hydraulic pressure chamber 120. Furthermore, a return spring 123, adapted to bias the rear master piston 115 rearwards, is provided in a compressed state between the rear master piston 115 and the front master piston 116 within the rear output hydraulic pressure chamber 119. A front return spring 124, adapted to bias the front master piston 116 rearwards, is provided in a compressed state between the end wall 117a and the front master piston 116 within the front output hydraulic pressure chamber 120.

A cylindrical rear connecting cylindrical portion 125 which communicates with a secondary fluid reservoir chamber 26 of a reservoir R and a cylindrical front connecting cylindrical portion 126 which communicates with a primary fluid reservoir chamber 25 are provided integrally on an upper portion of the tertiary casing 117 in two locations which are spaced apart from each other in an axial direction so as to project upwards therefrom.

The rear master piston 115 is such that front and rear piston portions 115a, 115b are provided integrally and continuously via a small diameter connecting portion 115c. A cup seal 128 is mounted on the front piston portion 115a so as to be brought into sliding contact with an inner surface of the tertiary cylinder bore 118 while permitting a flow of operating fluid to the rear output hydraulic pressure chamber 119 side. A cup seal 129 is mounted on the rear piston portion 115b so as to be brought into sliding contact with the inner surface of the tertiary cylinder bore 118.

A rear supply fluid chamber 130 is formed annularly between an outer circumference of the rear master piston 115 and the inner surface of the tertiary cylinder bore 118 and between the front and rear piston portions 115a, 115b. A supply port 131 is opened in the tertiary casing 117 so as to communicate with the rear supply fluid chamber 130 and to open to an inside of the rear connecting cylindrical portion 125, so that brake fluid supplied from a secondary fluid reservoir chamber 26 of the reservoir R is supplied into the rear supply fluid chamber 130.

A center valve 132 is mounted on the rear master piston 115 which is adapted to establish a communication between the rear output hydraulic pressure chamber 119 and the rear supply fluid chamber 130 when the rear master piston 115 returns to its withdrawal limit position.

This center valve 132 includes:
a valve casing 133 which is mounted coaxially at a front end portion of the rear master piston 115;
an axial passage 134 which is bored coaxially in the front piston portion 115a of the rear master piston 115 and is made to open to a front end portion of the front piston portion 115a within the valve casing 133;
a valve body 135 which is accommodated in the valve casing 133 so as to move back and forth to thereby close the front end opening of the axial passage 134;
a valve spring 136 which is accommodated in the valve casing 133 so as to exhibit a spring force which biases the valve body 135 rearwards or in a direction in which the valve body 135 closes the axial passage 134; and
a stopper pin 137 which is adapted to hold the valve body 135 in a forward position against biasing force of the valve spring 136 when the rear master piston 115 is its withdrawal limit position and to permit withdrawal or closure of the valve body 135 by the valve spring 136 when the rear master piston 115 travels forwards.

In the small diameter connecting portion 115c of the rear master piston 115, a through bore 138, which is formed into a long bore long in an axial direction of the small diameter connecting portion 115c, is provided so as to extend along a diametrical line of the small diameter connecting portion 115c. The through bore 138 is made to communicate with the rear supply fluid chamber 130 at both ends thereof. The stopper pin 137 is made to pass through the through bore 138 to be fixed to the tertiary casing 117, and a rear end of a valve stem 135a, which is provided continuously to the valve body 135 so as to pass though the axial passage 134, is brought into abutment with the stopper pin 137.

According to the center valve 132 which is configured as has been described above, when the rear master piston 115 is in its withdrawal limit position, the valve stem 135a is pushed by the stopper pin 137, and the valve body 135 is put in a position where it opens the axial passage 134. Thus, the center valve 132 is opened to establish a communication between the rear output hydraulic pressure chamber 119 and the through bore 138, thereby making it possible to enable a supply of supply fluid from the rear supply fluid chamber 130 to the rear output hydraulic pressure chamber 119.

In addition, when the rear master piston 115 travels forwards from its withdrawal limit position, the stopper pin 137 moves relatively to the rear master piston 115 to be located in a rear position within the through bore 138, whereby the valve body 135 moves to a position where the valve body 135 closes more the axial passage 134 by virtue of the spring force of the valve spring 136. Therefore, the communication between the rear supply fluid chamber 130 and the rear output hydraulic pressure chamber 119 is interrupted.

The front master piston 116 is such that front and rear piston portions 116a, 116b are provided integrally and continuously via a small diameter connecting portion 116c, and a cup seal 140 is mounted on the front piston portion 116a so as to be brought into sliding contact with the inner surface of the tertiary cylinder bore 118 while permitting a flow of operating fluid to the front output hydraulic pressure chamber 120 side, and a cup seal 141 is mounted on the rear piston portion 116b so as to be brought into sliding contact with the inner surface of the tertiary cylinder bore 118.

A front supply fluid chamber 142 is formed annularly between an outer circumference of the front master piston 116 and the inner surface of the tertiary cylinder bore 118 and between the front and rear piston portions 116a, 116b. A supply port 143 is opened in the tertiary casing 117 so as to communicate with the front supply fluid chamber 142 and to open to an inside of the front connecting cylindrical portion 126, so that brake fluid supplied from the primary fluid reservoir chamber 25 of the reservoir R is supplied into the front supply fluid chamber 142.

A center valve 144 is mounted on the front master piston 116 which is adapted to establish a communication between the front output hydraulic pressure chamber 120 and the front supply fluid chamber 142 when the front master piston 116 returns to its withdrawal limit position.

This center valve 144 includes:

a valve casing 145 which is mounted coaxially at a front end portion of the front master piston 116;

an axial passage 146 which is bored coaxially in the front piston portion 116a of the front master piston 116 and is made to open to a front end portion of the front piston portion 116a within the valve casing 145;

a valve body 147 which is accommodated in the valve casing 145 so as to move back and forth to thereby close the front end opening of the axial passage 146;

a valve spring 148 which is accommodated in the valve casing 145 so as to exhibit a spring force which biases the valve body 147 rearwards or in a direction in which the valve body 147 closes the axial passage 146; and a stopper pin 149 which is adapted to hold the valve body 147 in a forward position against a biasing force of the valve spring 148 when the front master piston 116 is its withdrawal limit position and to permit withdrawal or closure of the valve body 147 by the valve spring 148 when the front master piston 116 travels forwards.

In the small diameter connecting portion 116c of the front master piston 116, a through bore 150, which is formed into a long bore elongating in an axial direction of the small diameter connecting portion 116c, is provided so as to extend along a diametrical line of the small diameter connecting portion 116c, and the through bore 150 is made to communicate with the front supply fluid chamber 142 at both ends thereof. The stopper pin 149 is made to pass through the through bore 150 to be fixed to the tertiary casing 117, and a rear end of a valve stem 147a, which is provided continuously to the valve body 147 so as to pass though the axial passage 146, is brought into abutment with the stopper pin 149.

According to the center valve 144 which is configured as has been described above, when the front master piston 116 is in its withdrawal limit position, the valve stem 147a is pushed by the stopper pin 149, and the valve body 147 is put in a position where it opens the axial passage 146. Therefore, the center valve 144 is opened to establish a communication between the front output hydraulic pressure chamber 120 and the through bore 150, thereby making it possible to enable a supply of supply fluid from the front supply fluid chamber 142 to the front output hydraulic pressure chamber 120.

In addition, when the front master piston 116 travels forwards from its withdrawal limit position, the stopper pin 149 moves relatively to the front master piston 116 to be located in a rear position within the through bore 150, whereby the valve body 147 moves to a position where the valve body 147 closes more the axial passage 146 by virtue of the spring force of the valve spring 148, thereby the communication between the front supply fluid chamber 142 and the front output hydraulic pressure chamber 120 being interrupted.

Namely, the master cylinder MB is configured into a center valve type master cylinder in which the center valves 132, 144 are mounted on the rear master piston 115 and the front master piston 116, respectively, which are adapted to operate to open so that brake fluid is supplied from the reservoir R to the rear and front output hydraulic pressure chambers 119, 120 when the rear and front master pistons 115, 116 are withdrawn.

A maximum spacing restriction unit 151 is provided between the rear and front master pistons 115, 116 to restrict a maximum spacing between these master pistons 115, 116.

This maximum spacing restriction unit 151 includes:

a retainer 152 which is brought into abutment with a back side of the rear piston portion 116b of the front master piston 116;

a rod 153 which is provided continuously to a front central portion of the valve housing 133 of the center valve 132 mounted on the rear master piston 152 so as to extend forwards and which is movably inserted in a central portion of the retainer 152 at a front portion thereof; and an engagement member 154 which is thread secured to a front end of the rod 153 so as to be brought into engagement with retainer 152 from the front. Moreover, a rear return spring 123 is provided in a compressed state between the valve housing 133 and the retainer 152, and the retainer 152 is actually in such a state that the retainer 152 is fixed to the front master piston 116.

According to the maximum spacing restriction unit 151 that is configured as has been described above, the maximum spacing between the rear and front master pistons 115, 116 is restricted by the engagement member 154 being brought into engagement with the central portion of the retainer 152 from the front.

Referring again to FIG. 4, the rear output port 121 of the master cylinder MB is connected to a wheel brake BA for a right front wheel and a wheel brake BB for a left rear wheel via a hydraulic pressure modulator 35, and the front output port 122 is connected to a wheel brake BC for a left front wheel and a wheel brake BD for a right rear wheel via the hydraulic pressure modulator 35.

In FIG. 6, a front portion of a quaternary casing 155, which is formed into a cylindrical shape with an inwardly directed flange portion 155a provided at a rear end thereof, is provided continuously to and coaxially with a rear end of the tertiary casing 117 provided on the master cylinder MB. Namely, the rear end of the tertiary casing 117 is fluid tightly fitted in the front portion of the quaternary casing 155, and a separator 156 and a sleeve 157, which are fluid tightly fitted in the quaternary casing 155, are held between the rear end of the tertiary casing 117 and the quaternary casing 155.

Provided in the quaternary casing 155 are a large diameter bore 158 into which the rear end of the tertiary casing 117, the separator 156 and the sleeve 157 are fluid tightly fitted from the front end side, and an intermediate diameter bore 160 which continues coaxially to a rear end of the large diameter bore 158 with an annular stepped portion 159 formed between the rear end of the large diameter bore 158 and itself and which is formed smaller in diameter than the large diameter bore 158. The inwardly directed flange portion 155a, which is provided at the rear end of the quaternary casing 155 so as to define a rear end of the intermediate diameter bore 160, forms a small diameter bore 161 which is formed smaller in diameter than the intermediate diameter bore 160.

The separator 156 and the sleeve 157 are fluid tightly fitted in the large diameter bore 158 so as to be held between the rear end of the tertiary casing 177 and the stepped portion 159 in the master cylinder MB in such a state that a leaf spring 162 is interposed between the separator 156 and the sleeve 157. Thus, the separator 156 and the secondary sleeve 157 are fixed in the front portion of the quaternary casing 155 in an ensured fashion while absorbing a dimensional tolerance with respect to a distance between the rear end of the tertiary casing 117 and the stepped portion 159.

The separator 156 is formed into a short cylindrical shape in which a quaternary cylinder bore 163, which is slightly smaller in diameter than the tertiary cylinder bore 118 of the tertiary casing 117 of the master cylinder MB, is defined by an inner circumference thereof. In addition, the sleeve 157 is formed into a cylindrical shape in which a front large diameter bore 164 which is slightly larger in diameter than the quaternary cylinder bore 163 and a rear small diameter bore 165 which is smaller in diameter than the front larger diameter bore 164 and is equal in diameter to the quaternary cylinder bore 163 are formed coaxially. Thus, by the separator 156 and the sleeve 157 which are fluid tightly fitted and fixed in the quaternary casing 155, the quaternary cylinder bore 163, which is coaxial with the tertiary cylinder bore 118, the front large diameter bore 164, which is larger in diameter than the quaternary cylinder bore 163, and the rear small diameter bore 165, which is equal in diameter to the quaternary cylinder bore 163, are defined coaxially and sequentially in that order from the front.

The stroke simulator 8B includes:

a cylindrical backup piston 168 which is slidably accommodated in the quaternary cylinder bore 163 and the rear small diameter bore 165 with its front end made to face the boosted hydraulic pressure chamber 114, a piston 170 which is slidably fitted in the backup piston 168 with its front end made face a hydraulic pressure generating source hydraulic pressure chamber 169 into which the output hydraulic pressure of the hydraulic pressure generating source 112 is introduced, a simulator piston 171 which is inserted into a rear portion of the backup piston 168 in such manner as to move relatively in the axial direction with its front end brought into abutment with a rear end of the piston 170, an input piston 172 which is fitted in the simulator piston 171 so as to slide relatively thereto, and a spring-back element 173 which is interposed between the input piston 172 and the simulator piston 171.

A primary port 174, a secondary port 175 and a tertiary port 176 are provided in the quaternary casing 155 sequentially in that order from the front while being spaced apart from each other. The primary port 174 is made to open to an inner surface of the large diameter bore 158 in a position on the quaternary casing 155 which corresponds to a position lying between the tertiary casing 117 of the master cylinder MB and the separator 156. The secondary port 175 is made to open to the inner surface of the large diameter bore 158 in a position on the quaternary casing 155 which corresponds to a position lying between the separator 156 and the sleeve 157. The tertiary port 176 is made to open to an inner surface of a front portion of the intermediate diameter bore 160.

As is shown in FIG. 4, the second port 175 is connected to the hydraulic pressure generating source 112. This hydraulic pressure generating source 112 includes:

a pump 177 which pumps up operating fluid from the third fluid reservoir chamber 27 of the reservoir R;

an accumulator 178 which is connected to a discharge side of the pump 177; and a hydraulic pressure sensor 179 which is adapted to detect the hydraulic pressure of the accumulator 178 so as to control the operation of the pump 177.

A high constant hydraulic pressure is supplied from the hydraulic pressure generating source 112 to the secondary port 175. In addition, the tertiary port 176 is connected to the tertiary fluid reservoir chamber 27 of the reservoir R.

An annular recess portion 180, to which the primary port 174 is made to open at an inner end thereof, and an annular recess portion 181, to which the secondary port 175 is made to open at an inner end thereof, are provided on the inner surface of the large diameter bore 158 of the quaternary casing 155. Annular seal members 182, 183, 184 are mounted, respectively, on outer circumferences of the tertiary casing 117 of the master cylinder 1B, the separator 156 and the sleeve 157 so as to seal the annular recesses 180, 181 from both sides thereof.

A front portion of the backup piston 168 is fluid tightly and slidably fitted in the quaternary cylinder bore 163 in the separator 156, and an axially intermediate portion of the backup piston 168 is fluid tightly and slidably fitted in the rear small diameter bore 165 in the sleeve 157. An annular path 185 is formed in a portion which corresponds to the front large diameter bore 164 in the sleeve 157 between the sleeve 157 and the backup piston 168, and this annular path 185 communicates with the annular recess 181 which communicates with the secondary port 175.

Moreover, the annular path 185 is sealed on front and rear sides thereof by an annular seal member 186 which is mounted on an inner circumference of the separator 156 so as to be brought into sliding contact with an outer circumference of the backup piston 168 and a annular seal member 187 which is mounted on an inner surface of the rear small diameter bore 165 at the rear of the sleeve 157 so as to be brought into sliding contact with the outer circumference of the backup piston 168.

An inwardly directed flange portion 168a is provided integrally on the axially intermediate portion of the backup piston 168 so as to project radially inwards. In the backup piston 168, a front large diameter bore 188 and a small diameter bore 189, which is formed smaller in diameter than the large diameter bore 188 and which continues coaxially to a rear end of the large diameter bore 188, are formed further forwards than the inwardly directed flange portion 168a. The piston 170 is slidably and fluid tightly fitted in the small diameter bore 189.

Moreover, an end wall member 190 is fitted in a front end of the backup piston 168, and a snap ring 191 is mounted on an inner circumference of a front end portion of the backup piston 168 so as to be brought into abutment or engagement with an outer circumferential edge portion of the end wall member 190 from the front. Thus, the boosted hydraulic pressure chamber 114 in the master cylinder MB which the back side of the rear master piston 115 is made to face is defined between the rear master piston 115 and the backup piston 168 and the end wall member 190.

The hydraulic pressure generating source hydraulic pressure chamber 169 is defined between the end wall member 190 and the piston 170. A communication hole 192, adapted to make the annular path 185 communicate with the hydraulic pressure generating source hydraulic pressure chamber 169, is provided in the backup piston 168 so as to open to an inner surface of the large diameter bore 188. In addition, a spring 193 is provided in a compressed state between the end wall member 190 and the piston 170 within the hydraulic pressure generating source hydraulic pressure chamber 169 so as to bias the piston 170 in a withdrawal direction.

On the other hand, a ring-shaped stopper 194 is brought into abutment with the inwardly directed flange portion 155a of the quaternary casing 155. A coil-shaped spring 197 which surrounds a rear half portion of the backup piston 168 is provided in a compressed state between a retainer 196 which is brought into abutment or engagement with a snap ring 195 which is mounted on an outer circumference of a rear end portion of the backup piston 168 on an inner circumference thereof from the front and the sleeve 157. Accordingly, the backup piston 168 is spring biased rearwards by virtue of the spring force of the spring 197. Thus, the position where the snap ring 195 is brought into abutment with the stopper 194 which is in abutment with the inwardly directed flange portion 155a constitutes a withdrawal limit of the backup piston 168, and the front end of the backup piston 168 which is at its withdrawal limit faces the boosted hydraulic pressure chamber 114 and is in abutment with an outer circumferential edge portion of the back side of the rear master piston 115 which is in the inoperative state along the full circumference thereof in which state the rear master piston 115 is also at its withdrawal limit.

A groove 199 communicating with the annular recess portion 180 is provided on an upper portion of the rear end of the tertiary casing 117 of the master cylinder MB, whereby the annular recess portion 180 communicating with the primary port 174 communicates with the boosted hydraulic pressure chamber 114 via the groove 199. In addition, a groove 200 is provided in the rear end of the rear master piston 115 so as to introduce the boosted hydraulic pressure between the back side of the master piston 115 and the front end of the backup piston 168.

Further, a spring chamber 201 which surrounds the backup piston 168 is defined between the sleeve 157 and the inwardly directed flange portion 155a within the quaternary casing 155 so as to accommodate the spring 197, and this spring chamber 201 communicates with the tertiary port 176.

The inwardly directed flange portion 168a provided on an inner surface of the axially intermediate portion of the backup piston 168 defines a passage bore 202, and an abutment projection 170a provided integrally on a rear portion of the piston 170 is slidably fitted through the passage bore 202 to project rearwards from the inwardly directed flange portion 164a, so as to be brought into abutment of an end wall 171a at a front end of the simulator piston 171.

The input piston 172 is slidably fitted in a rear portion of the simulator piston 171 so that its withdrawal limit position is restricted by a snap ring 205 mounted at a rear end portion of the simulator piston 171. A stroke fluid chamber 214 is defined between the end wall 171a at the front end of the simulator piston 171 and the input piston 172. A front end portion of an input rod 206, which continues to the brake pedal 5, is directly connected to the input piston 172 so as to pivot therein. Namely, brake application effort is inputted into the input rod 206 via the input rod 206 as the brake pedal 5 is operated, and the input piston 172 travels forwards as the brake application effort is so inputted. Moreover, an annular seal member 207 is mounted on an outer circumference of the input piston 172 so as to be brought into sliding contact with an inner circumference of the simulator piston 171.

The spring-back element 173 is made up by connecting in series an elastic element 208 which is formed of an elastic material such as rubber and into a cylindrical shape and a metallic coil spring of which a spring load is set smaller than that of the elastic element 208 via a sliding member 210 which is slidably accommodated in the simulator piston 171. The elastic element 208 is interposed between the sliding member 210 and the input piston 172, and the coil spring 209 is interposed between the end wall 171a at the front end of the simulator piston 171 and the sliding member 210.

Moreover, the elastic element 208 and the coil spring 209 are interposed in series between the input piston 172 and the simulator piston 171 so that a spring force exhibited by the coil spring 209 is applied to the simulator piston 171 and the sliding member 210 is brought into abutment with the end wall 171a at the front of the simulator piston 171 at the initial stage of the brake applying operation by the brake pedal 5, whereby the elastic element 208 starts elastic deformation after the end of application of the spring force of the coil spring 209 to the simulator piston 171.

In addition, a load set on the coil spring 209 is set smaller than a load set on another spring member which is connected in series to the coil spring 209 so as to exhibit a longitudinal spring force. In this embodiment, the load set on the coil spring 209 is set smaller than a load set on the spring 193 which is connected in series to the coil spring 209 via the end wall 171a of the simulator piston 171 and the piston 170 and is accommodated in the hydraulic pressure generating source hydraulic pressure chamber 169.

A front end portion of a guide shaft 211, which passes through the elastic element 208 coaxially with the simulator piston 171, is press fitted in a central portion of the sliding member 210. A rear end portion of the guide shaft 211 is slidably fitted in the input piston 171. Namely, a sliding bore 212, into which the rear end portion of the guide shaft 211 is slidably fitted, and a bottomed bore 213, which is formed larger in diameter than the sliding bore 212, which continues to a rear portion of the sliding bore 212 at a front end thereof and which is closed at a rear end thereof are provided coaxially in a central portion of the input piston 172, whereby the rear end portion of the guide shaft 211 is allowed to project into the bottomed bore 213 as the input piston 172 travels forwards relative to the guide shaft 211.

A plurality of through holes 216 . . . are opened in the end wall 171a at the front of the simulator piston 171 equidistantly from the center of the simulator piston 171 so as to allow a release chamber 215 in which a front side of the end wall 171a is made to face to communicate with the stroke fluid chamber 214, whereby operating fluid is introduced into the stroke fluid chamber 214 defined in the simulator piston 171 through the through holes 216. In addition, these through holes 126 . . . are closed by a seat stopper 217 fixed to the backup piston 168 when the simulator piston 171 travels forwards over a forward stroke or more.

The simulator piston 171 is formed into a bottomed cylindrical shape in which a part of its inner circumferential surface is made into a tapered surface 220 which decreases in diameter as the inner circumferential surface extends further forwards than the input piston 172. In this embodiment, something like a front half portion of the simulator piston 171 is formed as a tapered cylindrical portion 168b of which an inner circumferential surface is made into a tapered surface 220.

The sliding member 210 is slidably accommodated in the simulator piston 171 further forwards than the tapered surface 220. In addition, the elastic element 208, which is mounted between the sliding member 210 and the input piston 172, is formed into a cylindrical shape which allows the elastic element 208 to elastically deform as an axial compression force produced in association with advancement of the input piston 172 is applied thereto while preventing the elastic deformation of the elastic element 208 sequentially from a front portion thereof by so restraining the elastic element 208 by the tapered surface 220 as the axial compression force increases, and the elastic element 208 remains in a circular cylindrical shape which is constant in outside diameter along its full axial length in such a state that no load is applied thereto.

Incidentally, the guide shaft 211, which is supported in the input piston 172 at the rear end portion thereof by causing the rear end portion to be fitted in the input piston 172, is formed into a circular cylindrical shape while having a release path 221 which is formed therein so as to extend along its full axial length coaxially. In the input piston 172, a plurality of passages 222 . . . , which are made to open to a bottomed bore 213 which communicates with the release path 221 at inner ends thereof are provided further forwards than the portion where the seal member 207 is mounted so as to extend along a radial direction of the input piston 172. Thus, a space defined between the elastic element 208 and the simulator piston 171 in the stroke fluid chamber 214 is made to communicate with the release path 221 in the guide shaft 211 by the passages 222 . . . and the bottomed bore 213.

In additions a release path 223 is provided in the sliding member 210 so as to coaxially continue to a front end of the release path 221, and a plurality of grooves 224 . . . are provided on a front end face of the sliding member 210 so as to extend along a radial direction of the sliding member 210 so as to avoid the closure of the release path 223 by the end wall 171a at the front of the simulator piston 171 when the sliding member 210 is brought into abutment with the end wall 171a.

By this configuration, the space defined within the simulator piston 171 between the elastic element 208 and the simulator piston 171 is allowed to communicate with the release chamber 215 via the passages 222 . . . , the bottomed bore 213, the release paths 221, 223, the grooves 224 . . . , and the through holes 216 . . . until the through holes 216 . . . are closed by the seat stopper 217 when the simulator piston 171 travels forwards to produce a hydraulically locked state in the stroke fluid chamber 214. Namely the space between the elastic element 208 and the simulator piston 171 is kept communicating with the release chamber 215 or the reservoir R during the forward stroke of the simulator piston 171 at the end of which operating fluid is sealed within the simulator piston 171.

Thus, when the hydraulic pressure in the hydraulic pressure generating source hydraulic pressure chamber 169 lowers due to the failure of the hydraulic pressure generating source 112, in response to brake application effort made by the brake pedal 5, the simulator piston 171 travels forwards while pushing the piston 170 until the end wall 171a at the front end thereof comes into abutment with the seat stopper 217 provided on the inwardly directed flange portion 168a of the backup piston 168. Furthermore, the simulator piston 171 moves the backup piston 168 forwards, so that a forward pressure can be applied to the rear master piston 115 from the backup piston 168.

Referring again to FIG. 4, the pressure regulating valve unit 113 is adapted to regulate the output hydraulic pressure of the hydraulic pressure generating source 112 based on a detection value of the detection unit 104 for detecting an amount of brake application effort or a brake pedal traveling distance for application of the regulated hydraulic pressure to the boosted hydraulic pressure chamber 114. The pressure regulating valve unit 113 includes a pair of primary solenoid valves 230, 231 which are connected in parallel between the hydraulic pressure generating source 112 and the primary port 174 which communicates with the boosted hydraulic pressure chamber 114 so as to enhance the amount of hydraulic pressure that is introduced into the boosted hydraulic pressure chamber 114 at the initial stage of the brake applying operation; and a secondary linear solenoid valve 232 which is provided between the primary port 174 and the third fluid reservoir chamber 27 of the reservoir R. The hydraulic pressure of the primary port 174 is detected by a hydraulic pressure sensor 233.

In addition, a release valve 234, which is adapted to release the hydraulic pressure in the boosted hydraulic pressure chamber 114 to the reservoir R side when the pressure regulating valve unit 113 fails, is provided between the primary port 174 and the tertiary fluid reservoir chamber 27 of the reservoir R. The release valve 234 is a normally closed solenoid valve.

Next, the function of the second embodiment will be described. The stroke simulator 8B is such that elastic element 208 made of the elastic material and the metallic coil spring 209 whose spring constant is smaller than that of the elastic element 208 are mounted in series between the input piston 172, which is connected to the brake pedal 5, and the simulator piston 171 so that the elastic element 208 starts elastic deformation after the end of application of the spring force exhibited by the coil spring 209 to the simulator piston 171 at the initial stage of the brake applying operation. The load set on the coil spring 209 is set smaller than the load set on the spring 193 which is connected in series to the coil spring 209 so that the longitudinal spring force is exhibited.

Consequently, since the elastic element 208 is in such a state that the load from the coil spring 209 has already been applied thereto, even though settling is produced in the elastic element 208, a feeling of ineffective stroke during normal braking can be eliminated by absorbing the settling so produced by the coil spring 209, and a two-stage operation simulating characteristic by the elastic element 208 and the coil spring 209 can be obtained. Moreover, at the initial stage of the brake applying operation, an ineffective stroke is made to be obtained by causing the coil spring 209 of the stroke simulator 8B to be deformed, so that an input of brake application effort at the initial stage of the brake applying operation is made to be relatively small, thereby making it possible to enhance the brake pedal operation feeling.

Incidentally, the simulator piston 171 is formed into the circular cylindrical shape in which part of the inner circumferential surface is formed as the tapered surface 220 which decreases in diameter as the inner circumferential surface extends forwards. The elastic element 208 of the stroke simulator 8B is accommodated axially slidably in the simulator piston 171 further rearwards than the tapered surface 220 and is accommodated in the simulator piston 171 while being interposed between the input piston 172 which is linked with the brake pedal 5 and the simulator piston 171. The elastic element 208 is formed into the cylindrical shape which permits the elastic deformation thereof as the axial compression force produced in association with advancement of the input piston 172 is applied thereto while restraining the elastic element 208 by the tapered surface 220 as the axial compression force increases so as to prevent the deformation of the elastic element 208 sequentially from the front portion thereof.

Namely, when the input piston 172 travels forwards as brake application effort made by the brake pedal 5 is inputted, the stroke increases proportionally according to the input load by compressing the coil spring 209 until the forward stroke reaches a certain value. Following this, when the input piston 172 travels forwards while compressing the elastic element 208 in the axial direction, although the elastic element 208 elastically deforms according to the axial compression, since the elastic deformation of the elastic element 208 is prevented sequentially from the front portion thereof by being restrained by the tapered surface 220 of the simulator piston 171 as the axial compression force increases, the variation in input load relative to the operation stroke of the brake pedal 5 becomes large.

In contrast to this, when the brake application effort by the brake pedal 5 is mitigated, in such a state that the elastic deformation of the elastic element 208 is prevented due to the elastic element 208 being restrained by the tapered surface 220, since the elastic energy that has increased in association with the restraint by the tapered surface 220 is applied to the brake pedal 5 in a direction in which the brake pedal 5 is pushed back a non-linear characteristic can be imparted to a relationship between the brake application stroke and applied load in the stroke simulator 8B, and the hysteresis width can be increased, thereby making it possible to reduce the load borne by the driver when he or she applies the brakes. In addition, this enables production of a brake pedal operation feeling which is equal to the feeling that can be obtained by a general vehicle brake apparatus in which a master cylinder, vacuum booster and wheel brakes are combined, whereby the driver does not have to feel a sensation of physical disorder when he or she applies the brakes.

In addition, since the elastic element 208 is such that the elastic element 208 is kept in the circular cylindrical shape which has the constant outside diameter throughout its axial length with no load applied thereto, the shape of the elastic element 208 is allowed to be simple. This facilitates the formation of the elastic element 208, thereby making it possible to eliminate the generation of unbalanced load in the elastic element 208 so as to enhance the durability thereof.

Incidentally, operating fluid is introduced into the simulator piston 171, and the space defined between the elastic element 208 and the simulator piston 171 is allowed to communicate with the reservoir R during the forward stroke of the simulator piston which continues until operating fluid is sealed within the simulator piston 171. Accordingly, a risk is reduced that the operating fluid within the simulator piston 117 is locked while remaining between the elastic element 208 and the simulator piston 171 before the simulator piston 117 has reached the predetermined forward stroke. Further, desired hysteresis can be obtained while ensuring that the elastic element 208 is brought into abutment with the inner circumferential surface of the simulator piston 117, thereby there being no case where the brake pedal operability is damaged.

In addition, the cylindrical guide shaft 211 is supported in the input piston 172 which has the coaxial release path 221 which establishes the communication between the space defined between the elastic element 208 and the simulator piston 171 and the reservoir R and passes through the elastic element 208, and the release path 221 can be formed with the simple configuration.

In the configuration in which the simulator piston 171 is formed into the bottomed cylindrical shape in which the front side of the simulator piston 117 is made to face the release chamber 215 defined within the backup piston 168 so as to communicate with the reservoir R. The simulator piston 171 also has the end wall 171a in which the through holes 216 are provided at the front end thereof. The input piston 172 defines the stroke fluid chamber 214 between the end wall 171a and itself and is fluid tightly and slidably fitted n the simulator piston 171. The seat stopper 217 is provided in the backup piston 168 which closes the through holes when the simulator piston 171 travels forwards over the predetermined forward stroke or more, when the through holes 216 at the front end of the simulator piston 171 are closed at the end of the forward stroke of predetermined amount or more of the simulator piston 171. Due to these configurations, the stroke fluid chamber 214 is put in the tightly closed state, and the forward travel of the input piston 172 relative to the simulator piston 171 is prevented, whereby when the hydraulic pressure generating source 112 fails, the increase in ineffective stroke of the brake pedal 5 and reaction force can be suppressed by the stroke simulator 8B. Moreover, the construction is simplified in which operating fluid is sealed in the simulator piston 171 after the forward stroke of predetermined amount or more of the simulator piston 171.

In addition, the pressure regulating valve unit 113 is made up of: the pair of primary linear solenoid valves 230, 231 which are connected in parallel between the hydraulic pressure generating source 112 and the primary port 174 which communicates with the boosted hydraulic pressure chamber 114; and the secondary linear solenoid valve 232 which is provided between the primary port 174 and the tertiary fluid reservoir chamber 27 of the reservoir R. The pressure regulating valve unit 113 is also configured to electrically be driven. Therefore, the boost ratio can freely be changed depending upon models lines, whereby the brake system can be applied to many model lines each having a different specification with the simple configuration, thereby making it possible not only to avoid the increase in the number of components involved but also to configure the pressure regulating valve unit 113 with the simple construction.

Additionally, since the release valve 234 is provided between the boosted hydraulic pressure chamber 114 and the reservoir R which is adapted to release the hydraulic pressure in the boosted hydraulic pressure chamber 114 to the reservoir R side when the pressure regulating valve unit 113 fails, the occurrence of a hydraulically locked state in the boosted hydraulic pressure chamber 114 when the pressure regulating valve unit 113 fails can be eliminated with the simple configuration. Furthermore, the release valve 234 is the normally closed solenoid valve, and in the normal brake applying operation, the release valve 234 only has to be held in the deenergized closed state, thereby making it possible to suppress the consumption of electric power.

Thus, while the embodiments of the invention have been described heretofore, the invention is not such as to be limited thereto, and hence, various design changes can be implemented without departing from the spirit and scope of the invention described in the claims of the invention.

For example, while in the embodiments, the master cylinders MA, MB are configured as the tandem type master cylinder, a master cylinder may be adopted in which a single piston is slidably fitted in a casing.

In addition, a manually operated bleeder or a mechanical relief valve may be adopted for the release valves 103, 234 in place of the normally closed solenoid valve.

Furthermore, while in the embodiments, the detection unit 104 which detects the amount of brake application effort or brake pedal travel is configured to detect the stroke amount of the input pistons 52, 172, a detection approach may be adopted in which brake application effort is detected by a load sensor or the like.

<Third Embodiment>

Next, accompanying with FIGS. 7 to 10, the third and fourth embodiment of the present invention will be explained. The overall configurations of the third and fourth embodiments are substantially the same as those of the first and second embodiments as described above. The reference numbers, in which 1000 is added to the reference number in the first and second embodiments, is used to the member of the third and fourth embodiments which corresponds to the member of the first and second embodiments. Further, as for the common members between the third and fourth embodiments and the first and second embodiments, for example the brake pedal 1005 in the third embodiment and the brake pedal 5 in the first embodiment, the detailed explanations thereof are omitted and following explanations are mainly focused on the differences between the third and fourth embodiments and first and second embodiments.

Figure 7:
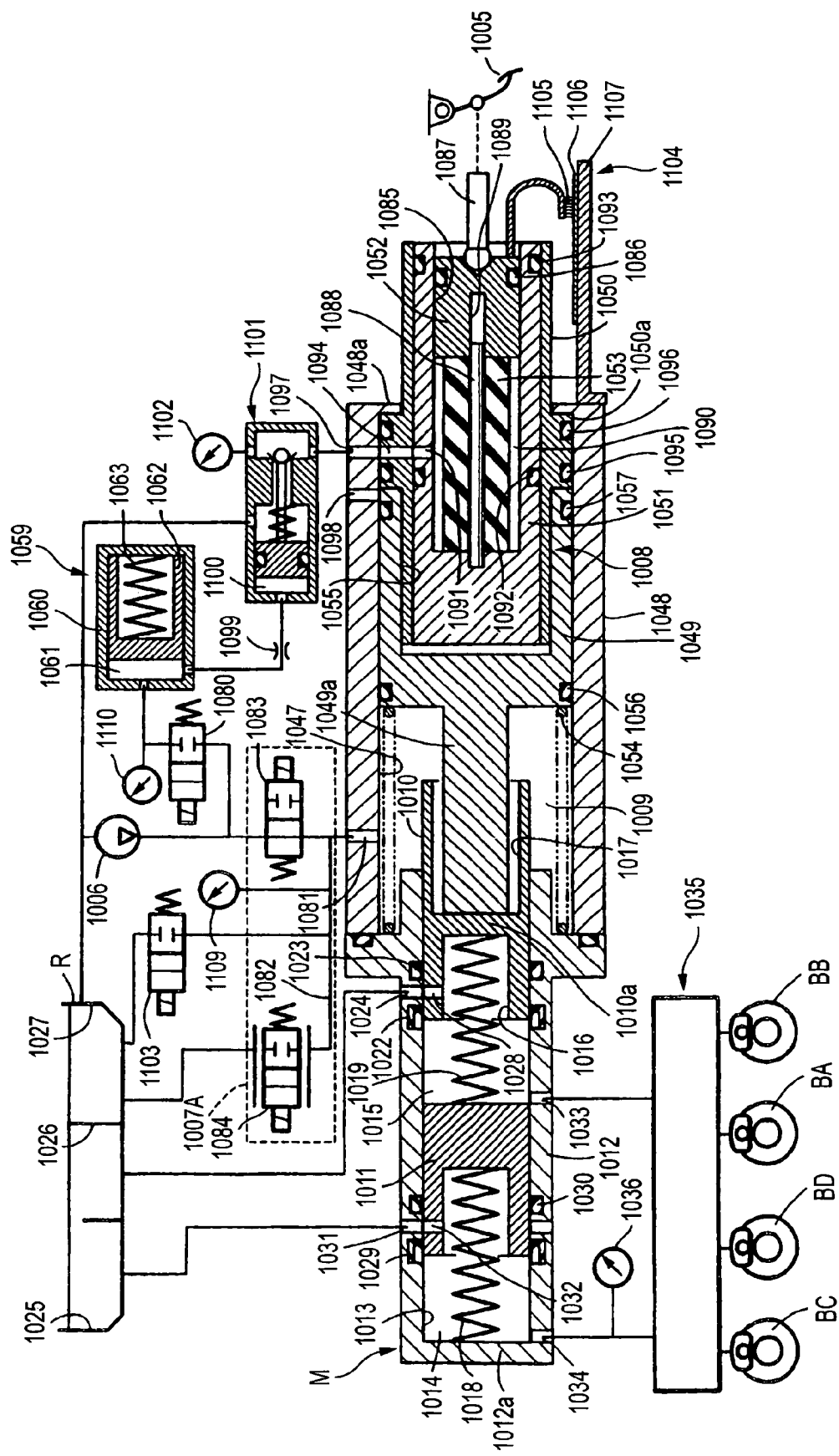
FIG. 7 is a brake hydraulic pressure system diagram showing an overall configuration of a vehicle brake apparatus of a first embodiment.
Figure 8:
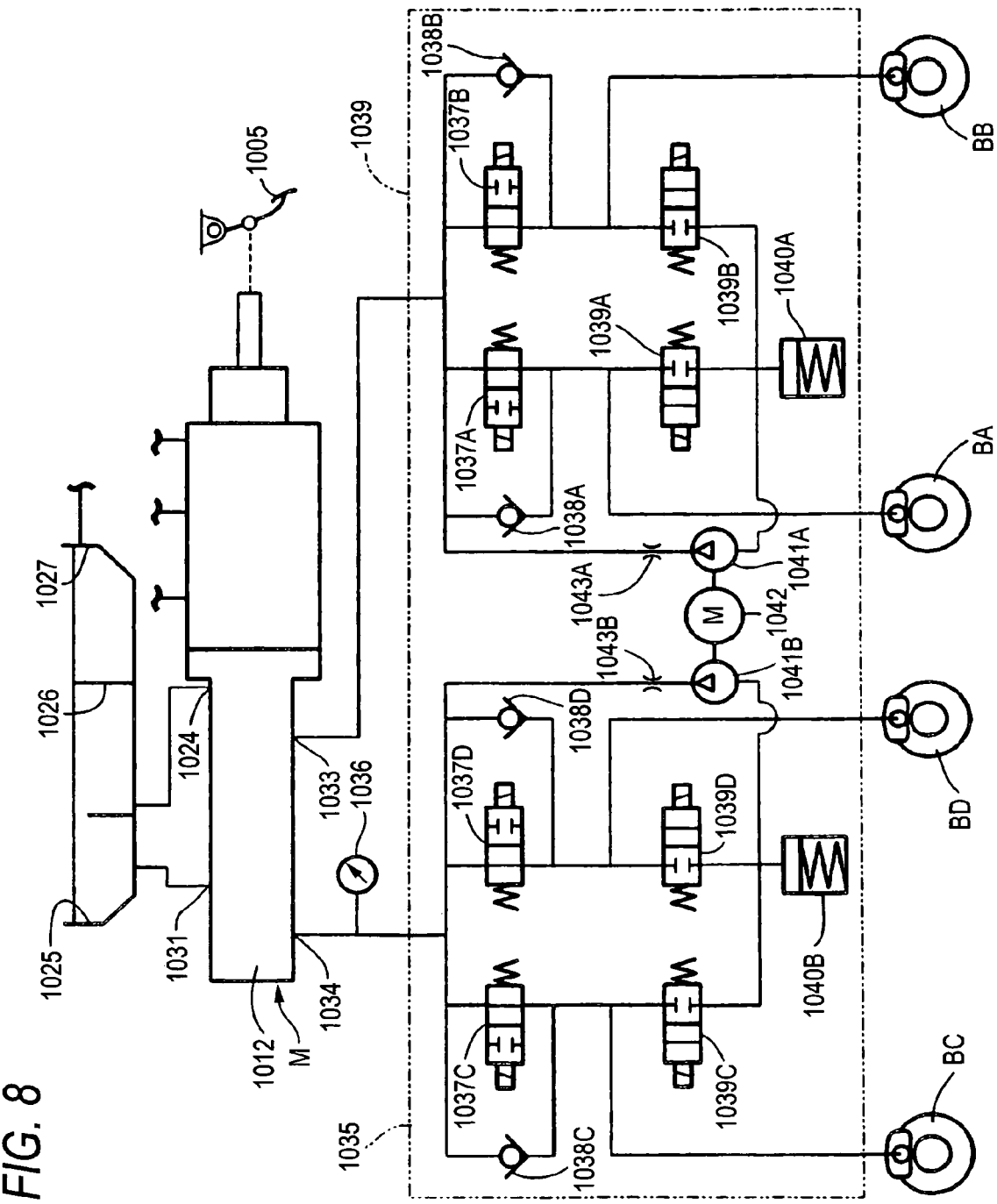
FIG. 8 is a hydraulic pressure circuit diagram showing the configuration of a hydraulic pressure modulator.
Figure 9:
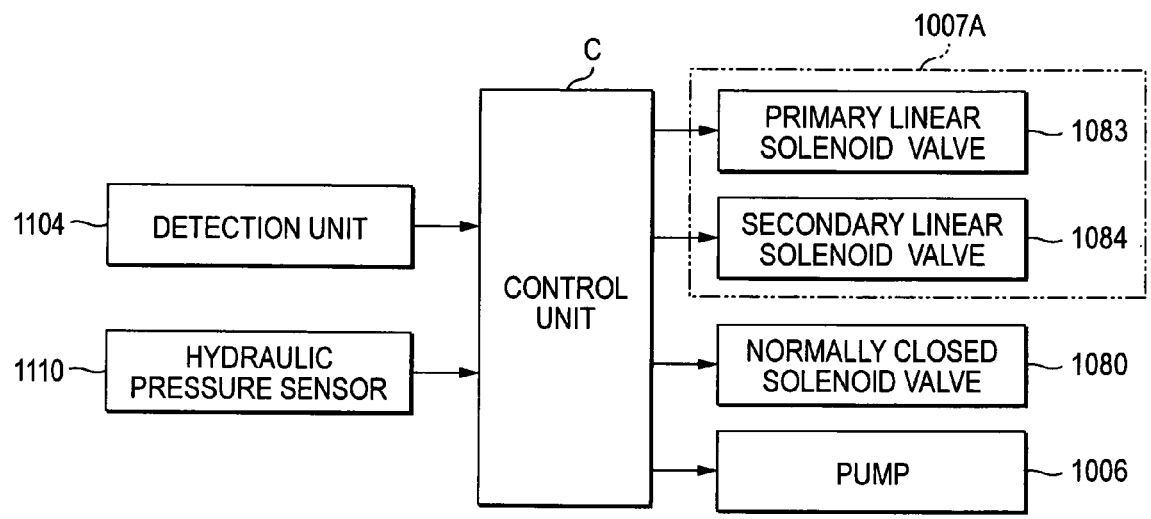
FIG. 9 is a block diagram showing the configuration of a control unit.

FIGS. 7 to 9 are such as to show a third embodiment of the invention. FIG. 7 is a brake hydraulic pressure system diagram showing an overall configuration of a vehicle brake apparatus, FIG. 8 is a hydraulic pressure circuit diagram showing the configuration of a hydraulic pressure modulator, and FIG. 9 is a block diagram showing the configuration of a control system.

The pump 1006, which is the hydraulic pressure generating source shown in FIG. 9, pumps up brake fluid from a tertiary fluid reservoir chamber 1027 of the reservoir (R), and a discharge port of the pump 1006 is connected to an accumulator chamber 1061 of an accumulator 1059 via a normally closed solenoid valve 1080 which is an open-close-valve.

In addition, a supply port 1081, which communicates with the boosted hydraulic pressure chamber 1009, is provided in the secondary casing 1048. The discharge port of the pump 1006 is connected via a primary linear solenoid valve 1083 to a hydraulic pressure path 1082 connected to the supply port 1081. Thus, the pressure regulating valve unit 107A is made up of the primary linear solenoid valve 1083; and a secondary linear solenoid valve 1084 which is provided between the hydraulic pressure path 1082 and the tertiary fluid reservoir chamber 1027 of the reservoir R. In addition, a hydraulic pressure sensor 1109 is connected to the hydraulic pressure path 1082, and a release valve 1103 adapted to be opened in response to an arbitrary operation by the driver of the vehicle is provided in parallel with the linear solenoid valve 1084 between the hydraulic pressure path 1082 which communicates with the boosted hydraulic pressure chamber 1009 and the tertiary fluid reservoir chamber 1027 of the reservoir R, the release valve 1103 being a normally closed solenoid valve.

Incidentally, the operation of the primary and secondary linear solenoid valves 1083, 1084 of the pressure regulating valve unit 107A is controlled by the control unit C, as shown in FIG. 9. The control unit C controls the operation of the primary and secondary linear solenoid valves 1083, 1084 according to a detection value of a detection unit 1104 which is adapted to detect the amount of brake application effort made by the brake pedal 1005. The control unit C also controls the normally closed solenoid valve 1080 to open or close so as to accumulate a hydraulic pressure by a set pressure which is set relatively low in the accumulator 1059 at least when the brakes are not applied with the pump 1006 in an operating state while controlling the normally closed solenoid valve 1080 to open at an initial stage of a brake applying operation.

A timing at which the normally closed solenoid valve 1080 is controlled to open or close so as to accumulate the aforesaid hydraulic pressure in the accumulator 1059 is executed by controlling the normally closed solenoid valve 1080 to open or close according to a detection value of the hydraulic pressure sensor 1110 while causing the pump 1006 to operate in such a state that the primary linear solenoid valve 1083 is closed with the brakes not applied after the end of the brake applying operation. The normally closed solenoid valve 1083 is opened at the initial stage of the brake applying operation so as to accumulate the hydraulic pressure in the accumulator 1059, and thereafter the normally closed solenoid valve 1080 is closed. Then, when the hydraulic pressure sensor 1109 detects that the hydraulic pressure in the boosted hydraulic pressure chamber 1009 has reached a predetermined value, the normally closed solenoid valve 1081 is caused to open again, so as to supply the hydraulic pressure within the accumulator 1059 to the boosted hydraulic pressure chamber 1009.

As shown, for example, in FIG. 7, the detection unit 1104 is such as to include a brush 1105 mounted on the input piston 1052 and a pair of electrical conductors 1106 . . . which extend in parallel with an axial direction of the input piston 1052 so as to change a sliding contact position with the brush 1105 as the input piston 1052 travels in the axial direction, and the electrical conductors 1106 . . . are mounted on a support member 1107 which is mounted at a rear end of the secondary casing 1048.

Next, the function of the third embodiment will be described. When the brakes are not applied, the normally closed solenoid valve 1080 is in the closed state, and the accumulator 1059 is holding the hydraulic pressure which is set relatively low. When the brakes are applied by depressing the brake pedal 1005 in this state, the operation of the pump 1006 is started, and the normally closed solenoid valve 1080 opens, whereby the hydraulic pressure is applied to the boosted hydraulic pressure chamber 1009 from the accumulator 1059, and the brake applying operation by the master cylinder M is started, thereby the pressure raising response being able to be enhanced.

Incidentally, since the hydraulic pressure generating source is made up of only the pump 1006 with the high pressure accumulator deleted, the layout performance of the hydraulic pressure generating source on the vehicle body can be enhanced. In addition, the capacity of the accumulator 1059 and the pressure held by the accumulator 1059 are set low sufficiently to such an extent that the initial operation of the master cylinder is permitted, whereby the capacity and weight of the accumulator 1059 can be reduced to such an extend that the layout performance of the hydraulic pressure generating source on the vehicle body can be enhanced.

In the tandem type master cylinder M, as the hydraulic pressure in the boosted hydraulic pressure chamber 1009 increases, the rear and front master pistons 1010, 1011 travel forwards against the spring forces of the rear and front return springs 1019, 1018, whereby hydraulic pressures produced respectively in the rear and front output hydraulic pressure chambers 1015, 1014 are outputted from the rear and front output ports 1033, 1034, respectively. Namely, by boost operating the rear and front master pistons 1010, 1011 of the master cylinder M, the boosted hydraulic pressure can be applied to the respective wheel brakes BA to BD.

Moreover, the pressure regulating valve unit 107A is made up of only the primary and secondary linear solenoid valves 1083, 1084, and the pressure regulating valve unit 107A can be configured simple. In addition, the boost ratio can freely be changed depending upon many model lines, and hence, the brake system with the hydraulic pressure generating source can be applied to many types of vehicles each having a different specification with the simple configuration.

Moreover, since the release valve 1103 adapted to open in response to an arbitrary operation by the driver of the vehicle is provided between the boosted hydraulic pressure chamber 1009 and the reservoir R, the occurrence of a hydraulically locked state in the boosted hydraulic pressure chamber 1009 when the pressure regulating valve unit 107A fails can be avoided with the simple configuration. Furthermore, since the release vale 1103 is the normally closed solenoid valve, the release valve 1103 only has to be held in the deenergized closed state during the normal brake applying operation, thereby making it possible to suppress the consumption electric power.

Incidentally, the open-close-valve 1101 opens when the pump 1006 fails, and a hydraulically locked state is produced in the annular fluid chamber 10090 which surrounds the elastic element 1053. Due to this in the stroke simulator 1008, the backup piston 1049 travels forwards together with the input piston 1052 against the spring force of the spring 1054 as the brake pedal 1005 is depressed, the fitting projection 1049a at the leading end of the backup piston 1049 is brought into abutment with the rear master piston 1010 so as to push forwards the rear master piston 1010, thereby making it possible to actuate the master cylinder M in response to the depressing operation of the brake pedal 1005 also when the pump 1006 fails.

<Fourth Embodiment>

Figure 10:
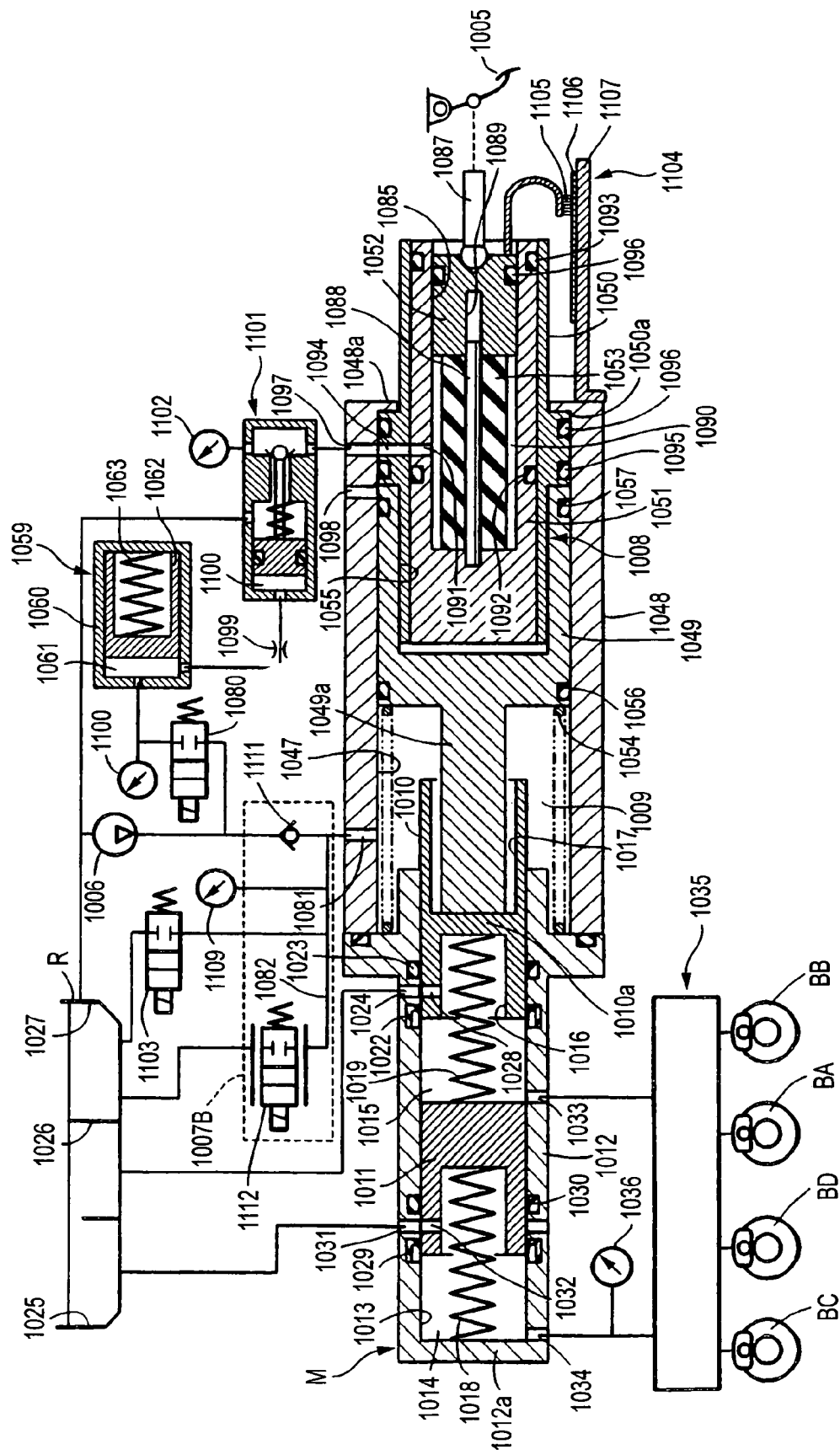
FIG. 10 is a brake hydraulic pressure system diagram showing an overall configuration of a vehicle brake apparatus of a second embodiment.

FIG. 10 is such as to show a fourth embodiment of the invention, and like reference numerals used in the third embodiment will be imparted to like portions of the fourth embodiment to those of the third embodiment.

A pressure regulating valve unit 1007B is adapted to regulate an output hydraulic pressure of a pump 1006 in response to an input of brake application effort from a brake pedal 1005 for application of the regulated pressure to a boosted hydraulic pressure chamber 1009. This pressure regulating valve unit 1007B is made up of a one-way valve 111 which is provided between a hydraulic pressure path 1082 which communicates with the boosted hydraulic pressure chamber 1009 and the pump 1006 so as to permit only a flow of brake fluid from the pump 1006 side and a linear solenoid valve 1112 which is provided between the hydraulic pressure path 1082 which communicates with the boosted hydraulic pressure chamber 1009 and a tertiary fluid reservoir chamber 1027 of a reservoir R.

According to the fourth embodiment as well, the pressure regulating valve unit 1007B can be configured so simply as to be made up of the one-way valve 1111 and the linear solenoid valve 1112, and the boost ratio can freely be changed depending upon model lines, whereby the brake system can be applied to various types of vehicles each having a different specification with the simple configuration.

For example, while in the embodiments described heretofore, the detection unit 1104 adapted to detect the amount of brake application effort made by the brake pedal 1005 or traveling distance of the brake pedal 1005 is made to detect the stroke amount of the input piston 1052, a configuration may be adopted in which brake application effort is detected by a load sensor or the like. In addition, a normal open-close-valve which has no linear control function can be used in place of the primary linear solenoid valve 1083.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicle brake apparatus comprising:
a boosted hydraulic pressure chamber;
a master cylinder comprising:
  a master piston of which back side faces the boosted hydraulic pressure chamber; and
  a casing accommodating the master piston in a slidable manner;
a hydraulic pressure generating source;
a reservoir; and
a pressure regulating valve unit which regulates output hydraulic pressure of the hydraulic pressure generating source in response to an input of brake application effort from a brake operation member for application to the boosted hydraulic pressure chamber;
wherein the master cylinder is connected to wheel brakes,
the pressure regulating valve unit electrically controls to adjust the output hydraulic pressure of the hydraulic pressure generating source to apply the adjusted hydraulic pressure to the boosted hydraulic pressure chamber,
a release valve is interposed between the boosted hydraulic chamber and the reservoir, and
the release valve is a normally closed solenoid valve which releases the hydraulic pressure in the boosted hydraulic pressure chamber to the reservoir side when the pressure regulating valve unit fails.

2. The vehicle brake apparatus as set forth in claim 1, wherein
the pressure regulating valve unit comprises:
  a one-way valve provided between the hydraulic pressure generating source and the boosted hydraulic pressure chamber so as to permit only a flow of brake fluid from the hydraulic pressure generating source side; and
  a linear solenoid valve interposed between the boosted hydraulic pressure chamber and the reservoir.

3. The vehicle brake apparatus as set forth in claim 2, wherein the linear solenoid valve is a normally closed linear solenoid valve.

4. The vehicle brake apparatus as set forth in claim 3, wherein the release valve is provided in parallel with the linear solenoid valve between the boosted hydraulic pressure chamber and the reservoir.

5. The vehicle brake apparatus as set forth in claim 2, wherein the one-way valve is in direct fluid communication between the hydraulic pressure generating source and the hydraulic pressure chamber, without intervening valves.

6. The vehicle brake apparatus as set forth in claim 1, wherein
the pressure regulating valve unit comprises:
  a primary linear solenoid valve interposed between the hydraulic pressure generating source and the boosted hydraulic pressure chamber and
  a secondary linear solenoid valve interposed between the boosted hydraulic pressure chamber and the reservoir.

7. The vehicle brake apparatus as set forth in claim 1, further comprising a plurality of hydraulic pressure paths, wherein:
a first of the hydraulic pressure paths leads from the reservoir to a rear output hydraulic pressure chamber of the master cylinder;
a second of the hydraulic pressure paths leads from the reservoir to a front output hydraulic pressure chamber of the master cylinder;
a third of the hydraulic pressure paths leads from the reservoir to the pressure regulating valve unit; and a fourth of the hydraulic pressure paths leads from the reservoir to the release valve.

8. A vehicle brake apparatus comprising:
a boosted hydraulic pressure chamber;
a master cylinder comprising:
   a master piston of which back side faces the boosted hydraulic pressure chamber; and
   a casing accommodating the master piston in a slidable manner;
a hydraulic pressure generating source;
a reservoir; and
a pressure regulating valve unit which regulates output hydraulic pressure of the hydraulic pressure generating source in response to an input of brake application effort from a brake operation member for application to the boosted hydraulic pressure chamber;
wherein the master cylinder is connected to wheel brakes,
the hydraulic pressure generating source is made up of only a pump,
an accumulator is connected to the pump via a valve which prevents flow of the brake fluid to the pump side at least when the pump is not in operation,
an inlet valve is interposed between the boosted hydraulic pressure chamber and the accumulator, and
the inlet valve opens as the hydraulic pressure on the accumulator side increases higher beyond a set differential pressure than the hydraulic pressure on the boosted hydraulic pressure chamber side and also opens by mechanical pressure applied from the brake operation member at an initial stage of a brake applying operation,
wherein the pump is connected to the accumulator via an orifice.

9. The vehicle brake apparatus as set forth in claim 8, wherein
the pressure regulating valve unit comprises:
   a one-way valve which is provided between the pump and the boosted hydraulic pressure chamber so as to permit only a flow of brake fluid from the pump side; and
   a linear solenoid valve which is interposed between the boosted hydraulic pressure chamber and the reservoir, and
a release valve, which opens in response to an arbitrary operation, is provided in parallel with the linear solenoid valve between the boosted hydraulic pressure chamber and the reservoir.

10. The vehicle brake apparatus as set forth in claim 9, wherein
the linear solenoid valve is a normally closed solenoid valve, and
the release valve is a normally closed solenoid valve.

11. A vehicle brake apparatus comprising:
a boosted hydraulic pressure chamber;
a master cylinder comprising:
   a master piston of which back side faces the boosted hydraulic pressure chamber; and
   a casing accommodating the master piston in a slidable manner;
a hydraulic pressure generating source;
a reservoir; and
a pressure regulating valve unit which regulates output hydraulic pressure of the hydraulic pressure generating source in response to an input of brake application effort from a brake operation member for application to the boosted hydraulic pressure chamber;
wherein the master cylinder is connected to wheel brakes,
the hydraulic pressure generating source is made up of only a pump,
an accumulator is connected to the pump via a valve which prevents flow of the brake fluid to the pump side at least when the pump is not in operation,
an inlet valve is interposed between the boosted hydraulic pressure chamber and the accumulator, and
the inlet valve opens as the hydraulic pressure on the accumulator side increases higher beyond a set differential pressure than the hydraulic pressure on the boosted hydraulic pressure chamber side and also opens by mechanical pressure applied from the brake operation member at an initial stage of a brake applying operation, wherein
an open-close-valve is provided between the pump and the accumulator, and
the open-close-valve opens when the brakes are applied except the initial stage of the brake applying operation.

12. A vehicle brake apparatus comprising:
a boosted hydraulic pressure chamber;
a master cylinder comprising:
   a master piston of which back side faces the boosted hydraulic pressure chamber; and
   a casing accommodating the master piston in a slidable manner;
a hydraulic pressure generating source;
a reservoir; and
a pressure regulating valve unit which regulates output hydraulic pressure of the hydraulic pressure generating source in response to an input of brake application effort from a brake operation member for application to the boosted hydraulic pressure chamber;
wherein the master cylinder is connected to wheel brakes,
the hydraulic pressure generating source is made up of only a pump,
an accumulator is connected to the pump via an open-close-valve which is controlled by a control unit, and
the control unit controls the open-close-valve to open or close so as to accumulate a hydraulic pressure by a preset set pressure in the accumulator at least while the brakes are not applied and while the brakes are being applied with the pump in an operating state and controls the open-close-valve to open at an initial stage of a brake applying operation.

13. The vehicle brake apparatus as set forth in claim 12, wherein
the pressure regulating valve unit comprises:
   a primary linear solenoid valve provided between the pump and the boosted hydraulic pressure chamber; and
   a secondary linear solenoid valve provided between the boosted hydraulic pressure chamber and the reservoir.

14. The vehicle brake apparatus as set forth in claim 13, wherein
a release valve, which opens in response to an arbitrary operation, is provided between the boosted hydraulic pressure chamber and the reservoir.

15. The vehicle brake apparatus as set forth in claim 14, wherein
the release valve is a normally closed solenoid valve.

16. The vehicle brake apparatus as set forth in claim 12, wherein
the pressure regulating valve unit comprises:
   a one-way valve provided between the pump and the boosted hydraulic pressure chamber so as to permit only a flow of brake fluid from the pump side; and
   a linear solenoid valve provided between the boosted hydraulic pressure chamber and the reservoir.

* * * * *